United States Patent
Onishi et al.

(10) Patent No.: US 11,371,896 B2
(45) Date of Patent: Jun. 28, 2022

(54) SENSOR MODULE CONTAINING ELONGATE PIEZOELECTRIC SUBSTRATE AND PRESSURE DISTRIBUTION SENSOR PROVIDED WITH THE SAME

(71) Applicant: MITSUI CHEMICALS, INC., Tokyo (JP)

(72) Inventors: Katsuki Onishi, Nagoya (JP); Kazuhiro Tanimoto, Ichihara (JP); Mitsunobu Yoshida, Nagoya (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/634,983

(22) PCT Filed: Aug. 3, 2018

(86) PCT No.: PCT/JP2018/029265
§ 371 (c)(1),
(2) Date: Jan. 29, 2020

(87) PCT Pub. No.: WO2019/031414
PCT Pub. Date: Feb. 14, 2019

(65) Prior Publication Data
US 2020/0378846 A1 Dec. 3, 2020

(30) Foreign Application Priority Data

Aug. 9, 2017 (JP) .............................. JP2017-153933

(51) Int. Cl.
*G01L 1/16* (2006.01)
(52) U.S. Cl.
CPC ..................................... *G01L 1/16* (2013.01)

(58) Field of Classification Search
CPC ............. H01L 41/087; G01L 1/04–048; G01L 5/0004; G01L 5/16; G01N 3/20; G01B 7/18
See application file for complete search history.

(56) References Cited

U.S. PATENT DOCUMENTS 2,493,029 A * 1/1950 Ramberg .............. G01L 1/2212
338/5
4,278,000 A * 7/1981 Saito ...................... G10H 3/185
310/328

(Continued)

FOREIGN PATENT DOCUMENTS

| CN | 102230818 B | 4/2013 |
| CN | 104838512 A | 8/2015 |

(Continued)

OTHER PUBLICATIONS

International Search Report (with an English Translation) (Form PCT/ISA/210) and Written Opinion (Form PCT/ISA/237) dated Aug. 28, 2018, by the Japanese Patent Office for International Patent Application No. PCT/JP2018/029265 (7 pages).

*Primary Examiner* — Tran M. Tran
(74) *Attorney, Agent, or Firm* — Buchanan Ingersoll & Rooney PC

(57) ABSTRACT

A sensor module includes a holding member formed of an elastic body, a pressure bearing face provided at the holding member and configured to bear pressure, an adjoining face provided at the holding member so as to adjoin the pressure bearing face and configured to undergo deformation in accordance with the pressure borne by the pressure bearing face, and an elongate piezoelectric substrate arranged on the adjoining face.

9 Claims, 16 Drawing Sheets

(56) References Cited

U.S. PATENT DOCUMENTS

| | | | | |
|---|---|---|---|---|
| 4,486,683 A * | 12/1984 | Newman | H01L 41/45 | 264/435 |
| 4,568,851 A * | 2/1986 | Soni | H01L 41/087 | 174/131 A |
| 4,572,950 A * | 2/1986 | Harmer | G01B 11/18 | 250/227.14 |
| 4,738,146 A * | 4/1988 | Baumgartner | G01L 1/20 | 338/114 |
| 4,768,173 A * | 8/1988 | Gautier | G01V 1/208 | 367/15 |
| 4,849,946 A * | 7/1989 | Beauducel | G01L 23/10 | 367/155 |
| 4,932,253 A * | 6/1990 | McCoy | G01L 5/102 | 73/152.61 |
| 4,974,451 A * | 12/1990 | DeTeresa | G01N 3/08 | 324/701 |
| 4,984,222 A * | 1/1991 | Beauducel | B06B 1/0688 | 367/159 |
| 5,114,290 A * | 5/1992 | Moghe | B29C 53/585 | 156/391 |
| 5,275,885 A * | 1/1994 | Ogura | G01V 1/208 | 174/102 R |
| 5,325,011 A * | 6/1994 | Kahn | H01L 41/083 | 310/328 |
| 5,410,210 A * | 4/1995 | Sato | H01L 41/047 | 310/332 |
| 5,483,836 A * | 1/1996 | Kinnebrew | G01B 5/30 | 73/794 |
| 5,526,601 A * | 6/1996 | Onuma | A01K 97/125 | 43/17 |
| 5,827,981 A * | 10/1998 | March | G01L 1/25 | 73/862.642 |
| 5,907,213 A * | 5/1999 | Oshima | B60J 10/00 | 310/328 |
| 6,169,479 B1 * | 1/2001 | Boran | B60R 21/0136 | 180/169 |
| 6,191,414 B1 * | 2/2001 | Ogle | G01L 1/246 | 250/227.14 |
| 6,271,621 B1 * | 8/2001 | Ito | G01L 1/16 | 310/358 |
| 7,047,800 B2 * | 5/2006 | Thiesen | H01L 41/113 | 73/146 |
| 7,253,742 B2 * | 8/2007 | Davis | G01F 1/7082 | 340/606 |
| 7,293,467 B2 * | 11/2007 | Shank | B60N 2/002 | 73/780 |
| 7,308,820 B2 * | 12/2007 | Engel | G01F 1/20 | 73/53.01 |
| 7,362,040 B2 * | 4/2008 | Neubauer | H01H 3/142 | 310/330 |
| 7,367,239 B2 * | 5/2008 | Engel | G01L 9/0001 | 73/861.18 |
| 7,401,526 B2 * | 7/2008 | Starek | A61B 5/228 | 73/778 |
| 7,520,177 B2 * | 4/2009 | Secq | G01B 5/30 | 73/795 |
| 7,694,581 B2 * | 4/2010 | Secq | G01B 5/30 | 73/818 |
| 8,298,293 B2 * | 10/2012 | Leydet | A61F 2/70 | 623/24 |
| 8,720,024 B2 * | 5/2014 | Ting | H01L 41/0833 | 29/25.35 |
| 9,429,485 B1 * | 8/2016 | Cavallaro | G01L 1/16 | |
| 9,905,750 B2 * | 2/2018 | Yoshida | H01L 41/45 | |
| 10,031,155 B2 * | 7/2018 | Procopio | H01L 41/25 | |
| 10,067,009 B2 * | 9/2018 | Jaeger | G01L 1/2218 | |
| 10,347,815 B1 * | 7/2019 | Sleator | H01L 41/042 | |
| 10,563,970 B2 * | 2/2020 | Elsasser | H01B 7/04 | |
| 10,589,468 B2 * | 3/2020 | Trudeau | B29C 66/7422 | |
| 10,602,965 B2 * | 3/2020 | Connor | G06F 3/014 | |
| 10,615,332 B2 * | 4/2020 | Agarwal | H01L 41/087 | |
| 10,756,251 B2 * | 8/2020 | Kim | H01L 41/257 | |
| 10,784,434 B2 * | 9/2020 | Sanada | G01L 1/16 | |
| 10,890,495 B2 * | 1/2021 | Sugita | H01H 9/02 | |
| 10,950,779 B2 * | 3/2021 | Tajitsu | G01L 1/16 | |
| 11,156,531 B2 * | 10/2021 | Sami | G01H 1/003 | |
| 2004/0195940 A1 * | 10/2004 | Ogino | E05F 15/443 | 310/338 |
| 2008/0250894 A1 | 10/2008 | Fujiwara | | |
| 2009/0021117 A1 * | 1/2009 | Ueda | H03K 17/964 | 310/329 |
| 2011/0088489 A1 * | 4/2011 | Yamamoto | G01L 5/1627 | 73/862.627 |
| 2013/0307094 A1 | 11/2013 | Yoshiuchi et al. | | |
| 2015/0241288 A1 * | 8/2015 | Keen | G01L 1/16 | 361/761 |
| 2015/0280102 A1 * | 10/2015 | Tajitsu | H02N 2/18 | 310/338 |
| 2018/0151795 A1 * | 5/2018 | Cobanoglu | H01L 41/193 | |
| 2019/0002177 A1 * | 1/2019 | Chuang | G06Q 50/28 | |
| 2019/0003905 A1 | 1/2019 | Yoshida et al. | | |
| 2019/0240449 A1 * | 8/2019 | Nishizawa | A61M 25/0043 | |
| 2019/0386198 A1 * | 12/2019 | Ando | H01L 41/1132 | |
| 2020/0284666 A1 * | 9/2020 | Takahashi | G01L 1/26 | |
| 2020/0321516 A1 * | 10/2020 | Chiang | H01L 41/0477 | |
| 2021/0119107 A1 * | 4/2021 | Oomura | H01L 41/1132 | |

FOREIGN PATENT DOCUMENTS

| | | |
|---|---|---|
| CN | 105841851 A | 8/2016 |
| JP | H10132669 A | 5/1998 |
| JP | 2005351781 A | 12/2005 |
| JP | 2008146528 A | 6/2008 |
| JP | 2008183181 A | 8/2008 |
| JP | 2010071840 A | 4/2010 |
| TW | 201245725 A1 | 11/2012 |
| WO | 2017111108 A1 | 6/2017 |

* cited by examiner

SENSOR MODULE CONTAINING ELONGATE PIEZOELECTRIC SUBSTRATE AND PRESSURE DISTRIBUTION SENSOR PROVIDED WITH THE SAME

TECHNICAL FIELD

The present invention relates to a sensor module and a pressure distribution sensor provided with the same.

BACKGROUND ART

Recently trials have been performed into utilizing piezoelectric materials to cover conductors.

For example, known piezoelectric cables include configurations having a central conductor, a piezoelectric material layer, an outer conductor, and a sheath arranged coaxially to each other in this sequence from the center to the outside (see, for example, Patent Documents 1 and 2). In the piezoelectric cables described in Patent Documents 1 and 2, it is the piezoelectric cables themselves that configure pressure detection devices.

Pressure detection devices incorporating piezoelectric cables as sensors are also being produced. For example, Patent Literature 3 discloses a bed device capable of detecting a human body in which a piezoelectric cable arranged in a wavy shape is incorporated into a mattress. Moreover, for example, Patent Document 4 discloses an intruder alarm device in which a piezoelectric cable arranged in a wavy shape is incorporated within a sensor mat having a waterproof and dustproof configuration made from a urethane rubber.

Patent Document 1: Japanese Patent Application Laid-Open (JP-A) No. H10-132669
Patent Document 2: JP-A No. 2010-071840
Patent Document 3: JP-A No. 2005-351781
Patent Document 4: JP-A No. 2008-146528

SUMMARY OF INVENTION

Technical Problem

However, in the pressure detection devices described in Patent Documents 3 and 4, the piezoelectric cable is arranged in a wavy shape with respect to a pressure-applied face in order to broaden the detection range and to secure detection sensitivity. An issue, however, arises in that arranging the piezoelectric cable in a wavy shape with respect to a pressure-applied face results in a complicated structure and an increase in manufacturing costs.

An object of an aspect of the present invention is to provide a sensor module and a pressure distribution sensor equipped therewith that, when detecting pressure, enable a detection range to be secured and detection sensitivity to be raised while having a simple structure including a piezoelectric substrate.

Solution to Problem

Specific ways to address the above problem are as follows.
<1> A sensor module, including:
a holding member formed of an elastic body;
a pressure bearing face provided at the holding member and configured to bear pressure;
an adjoining face provided at the holding member so as to adjoin the pressure bearing face and configured to undergo deformation in accordance with the pressure borne by the pressure bearing face; and
an elongate piezoelectric substrate arranged on the adjoining face.
<2> The sensor module of <1>, wherein, at the adjoining face, the piezoelectric substrate is provided so as to surround the holding member around a pressure bearing direction of the pressure.
<3> A sensor module, including:
a holding member formed of an elastic body;
a pressure bearing portion provided at the holding member and configured to bear pressure;
an intersecting plane provided at the holding member so as to intersect a pressure bearing direction of the pressure and configured to undergo deformation in accordance with the pressure borne by the pressure bearing portion; and
an elongate piezoelectric substrate arranged along an outer edge portion of the intersecting plane.
<4> The sensor module of any one of <1> to <3>, wherein, when applied with a load, the holding member has a deformation per unit load in a range of from 0.01 mm to 1.0 mm.
<5> The sensor module of any one of <1> to <4>, wherein:
the piezoelectric substrate includes an elongate conductor, and an elongate piezoelectric material helically wound onto the conductor in one direction; and
the piezoelectric material is formed from an organic piezoelectric material.
<6> The sensor module of <5>, wherein the piezoelectric material is an optically active helical chiral polymer (A).
<7> The sensor module of <6>, wherein the helical chiral polymer (A) is polylactic acid.
<8> The sensor module of any one of <1> to <7>, wherein a string-shaped elastic member is connected to a leading end of the piezoelectric substrate, and the piece of elastic member is disposed together with the piezoelectric substrate at the holding member.
<9> The sensor module of any one of <1> to <8>, further including a protection member formed of an elastic body and provided at an outer peripheral portion of the holding member.
<10> A pressure distribution sensor, including plural of the sensor module of any one of <1> to <9> arranged in a lattice pattern.

An aspect of the present invention enables, when detecting pressure, a detection range to be secured and detection sensitivity to be raised while having a simple structure including a piezoelectric substrate.

DESCRIPTION OF EMBODIMENTS

Explanation follows regarding embodiments of the present invention. Note that the present invention is not limited to the following embodiments.

Herein, a numerical range represented by "from A to B" means a range including numerical values A and B as a lower limit value and an upper limit value, respectively.

Herein, "principal faces" of each of the elongate-flat-plate-shaped piezoelectric materials (a first piezoelectric material and a second piezoelectric material) means faces perpendicular to the thickness direction of the elongate-flat-plate-shaped piezoelectric material (i.e., faces including a lengthwise direction and a width direction thereof).

Herein, a "face" of a member means a "principal face" of the member unless otherwise specified.

Herein, a thickness, a width, and a length satisfy a relationship of thickness<width<length, as in the usual definitions thereof.

Herein, "adhesion" is a concept including "pressure sensitive adhesion". "Adhesive layer" is a concept including "pressure sensitive adhesive layer".

Herein, an angle formed between two line segments is expressed in a range of from 0° to 90°.

Herein, "film" is a concept including what is generally referred to as "sheets" as well as what is generally referred to as "films".

First Embodiment

Explanation follows regarding a sensor module 10 as a first embodiment, with reference to FIG. 1 to FIG. 4.

Sensor Module

Figure 1:
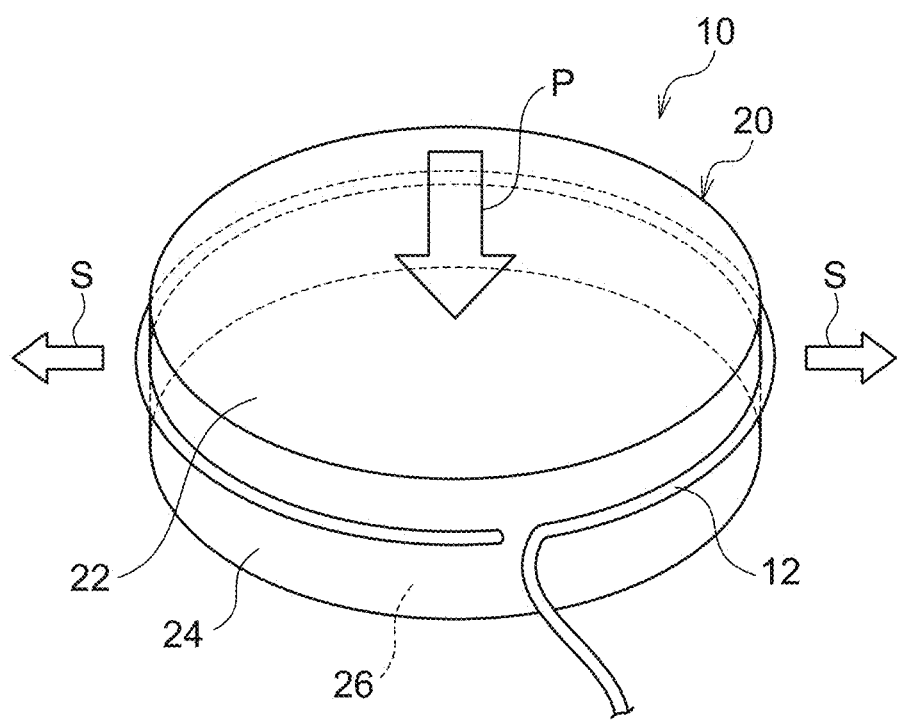
FIG. 1 is a perspective view of a sensor module of a first embodiment.

As illustrated in FIG. 1, the sensor module 10 according to the first embodiment includes a holding member 20 formed of a cylindrical elastic body, and an elongate piezoelectric substrate 12.

When, for example, the holding member 20 is installed on a floor surface and pressure is borne from above, an upper face of the holding member 20 configures a pressure bearing face 22 that bears pressure, and the lower face thereof configures an installation face 26, with a side face (cylindrical face) adjoining the pressure bearing face 22 and the installation face 26 configuring an adjoining face 24. As described above, the holding member 20 is an elastic body, and deformation of the adjoining face 24 occurs in accordance with the pressure borne by the pressure bearing face 22. Note that although the pressure bearing face 22 of the present embodiment is a flat face, there is no limitation thereof, and a curved face may be included. For example, the pressure bearing face 22 may include a face conforming to the shape of an object for applying pressure.

The piezoelectric substrate 12 formed in an elongated shape, namely a cable shape, is arranged on the adjoining face 24. Specifically, the piezoelectric substrate 12 is fixed by adhesion to the adjoining face 24 in a wound state on the cylindrical face thereof. In other words, the piezoelectric substrate 12 is provided on the adjoining face 24 so as to surround the holding member 20 around a pressure bearing direction of the pressure (indicated by arrow P in FIG. 1). Note that the piezoelectric substrate 12 of the present embodiment is fixed by adhesion at all the portions thereof that contact the adjoining face 24. The piezoelectric substrate 12 of the present embodiment generates a voltage when a tensile force is applied along the length direction thereof. Further details regarding the piezoelectric substrate 12 will be described later.

The following materials may be employed as the holding member 20.

Materials that may be employed therefor include: an elastomer such as a silicone elastomer, an acrylic elastomer, a urethane elastomer, a fluorine-based elastomer, a perfluoro elastomer, an isoprene rubber, a butadiene rubber, a styrene-butadiene rubber, natural rubber, a chloroprene rubber, a nitrile rubber, a butyl rubber, an ethylene propylene rubber, and an epichlorohydrin rubber; a polymer material such as polyethylene, polypropylene, polystyrene, polyvinylchloride, polyethylene terephthalate, a polycarbonate, polyamide, a polyvinyl alcohol, polyacetal, a polyimide, polyester, a cyclic polyolefin, a styrene-acrylonitrile copolymer, a styrene-butadiene-acrylonitrile copolymer, an ethylene-vinyl acetate copolymer, a methacrylic-styrene copolymer, an acrylic resin, a fluororesin, a urethane resin, a phenol resin, a urea resin, an epoxy resin, a cellulose-based resin, an unsaturated polyester resin, a melamine resin, a silicone resin, a copolymer or alloy thereof, a modified product thereof, and a foamed product (foam) thereof; and the like.

The sensor module 10 of the present embodiment includes the following operation. Namely, the adjoining face 24 undergoes bulging deformation toward the outside of the holding member 20 (indicated by arrow S in FIG. 1) as result of compression occurring between the pressure bearing face 22 and the installation face 26 when the pressure bearing face 22 on the holding member 20 bears pressure along the pressure bearing direction (indicated by arrow P in FIG. 1). As described above, the piezoelectric substrate 12 is provided on the adjoining face 24, and a tensional force is generated in the piezoelectric substrate 12 by bulging deformation of the adjoining face 24, generating a voltage.

Moreover, the adjoining face 24 undergoes compressional deformation toward the inside of the holding member 20 (the opposite direction to arrow S in FIG. 1) as a result of the pressure bearing face 22 being pulled away from the installation face 26 when the pressure bearing face 22 of the holding member 20 bears pressure in the opposite direction to the pressure bearing direction (indicated by arrow P in FIG. 1). As described above, the piezoelectric substrate 12 is provided on the adjoining face 24, and a compressional force is generated in the piezoelectric substrate 12 by compressional deformation of the adjoining face 24, generating a voltage in the opposite direction to when a tensile force is imparted to the piezoelectric substrate 12.

Note that in the present embodiment the location where pressure is borne (pressure bearing location) is not necessarily always at a central portion of the pressure bearing face 22, and moreover, the direction pressure is borne (pressure bearing direction) is not necessarily perpendicular to the pressure bearing face 22. Namely, there is no particular limitation to the pressure bearing location nor the pressure bearing direction, as long as the adjoining face 24 deforms when pressure is borne.

The holding member 20 of the present embodiment preferably has a hardness such that the indentation per unit load is in a range of from 0.01 mm to 1.0 mm when a metal cylindrical rod of 10 mm diameter is pushed into the pressure bearing face 22, and more preferably has a hardness such that the indentation is in a range of from 0.03 mm to 0.5 mm. Setting the hardness in the above ranges enables pressure applied to the pressure bearing face 22 to be detected at high sensitivity.

Piezoelectric Substrate

Explanation follows regarding an outline of the piezoelectric substrates employed in pressure detection in the sensor module 10 of the present embodiment.

The piezoelectric substrate of the present embodiment includes an elongate conductor, and an elongate first piezoelectric material helically wound in one direction around the conductor.

An organic piezoelectric material may be employed as the first piezoelectric material, with either low-molecular materials or polymer materials being adopted for the organic piezoelectric material. Examples of such organic piezoelectric materials include polyvinylidene fluoride or a polyvinylidene fluoride-based copolymer, polyvinylidene cyanide or a vinylidene cyanid-based copolymer, an odd NYLON such as NYLON 9, NYLON 11, an aromatic NYLON, an alicyclic NYLON, or a helical chiral polymer such as polylactic acid, a polyhydroxycarboxylic acid such as polyhydroxybutyrate, a cellulose-based derivative, polyurea or the like.

From the perspective of good piezoelectric characteristics, workability, and ease of sourcing, the first piezoelectric material is preferably a polymer organic piezoelectric material, and in particular an optically active helical chiral polymer.

The piezoelectric substrate of the present embodiment includes the first piezoelectric material being an optically active helical chiral polymer (A) (also referred to simply as the "helical chiral polymer (A)" hereafter), the lengthwise direction of the first piezoelectric material and the principal orientation direction of the helical chiral polymer (A) included in the first piezoelectric material being substantially parallel to each other, and a degree of orientation F of the first piezoelectric material being in a range from 0.5 up to but not including 1.0, determined from X-ray diffraction measurement by the following Formula (a):

$$\text{Herein, the degree of orientation } F=(180°-\alpha)/180° \quad (a)$$

Wherein α represents a half width of a peak derived from orientation. The unit of α is °.

In the following description of the piezoelectric substrate of the present embodiment, sometimes an "elongate conductor" is simply referred to as a "conductor", and sometimes an "elongate first piezoelectric material" is simply referred to as a "first piezoelectric material". Note that "one direction" means a direction the first piezoelectric material is wound from the near side to the far side of the conductor when the piezoelectric substrate of the present embodiment is viewed from one axial direction end of the conductor. Specifically, this is either a right direction (right-handed winding, namely clockwise) or a left direction (left-handed winding, namely counter clockwise).

Here, the degree of orientation F of the first piezoelectric material is an index indicating the degree of orientation of the helical chiral polymer (A) included in the first piezoelectric material, and is, for example, a degree of orientation in a c-axis measured by a wide-angle X-ray diffractometer (RINT 2550 manufactured by Rigaku Corporation, attachment device: rotational sample table, X-ray source: CuKα, output: 40 kV, 370 mA, detector: scintillation counter).

The degree of orientation F was measured by using the wide-angle X-ray diffractometer described above, fixing the sample (the ribbon-shaped piezoelectric material or the yarn-shaped piezoelectric material) onto a holder, and measuring the azimuth angle distribution intensity of a crystal plane peak [(110) plane/(200) plane].

In the obtained azimuth angle distribution curve (X-ray interferogram), the orientation degree F. (C-axis orientation degree) of the helical chiral polymer (A) was calculated and evaluated according to above Formula (a) on the basis of the degree of crystallinity and the half width of the peak (a).

Due to including such a configuration, the piezoelectric substrate of the present embodiment is excellent in piezoelectric sensitivity and also excellent in the piezoelectric output stability.

More specifically, the piezoelectric substrate of the present embodiment exhibits piezoelectric properties due to the first piezoelectric material including the helical chiral polymer (A), the lengthwise direction of the first piezoelectric material and the principal orientation direction of the helical chiral polymer (A) being substantially parallel to each other, and the degree of orientation F of the first piezoelectric material being from 0.5 up to but not including 1.0.

Moreover, the piezoelectric substrate of the present embodiment has a configuration in which the first piezoelectric material is helically wound in one direction around the conductor.

In the piezoelectric substrate of the present embodiment, due to the first piezoelectric material being arranged in the manner described above, a shear force is applied to the helical chiral polymer (A) when tension (stress) has been applied to the piezoelectric substrate in the lengthwise direction, and polarization of the helical chiral polymer (A) occurs along the radial directions of the piezoelectric substrate. When the helically wound first piezoelectric material is regarded as being an aggregate body of micro regions micronized to the extent that they approximate to flat planes along the lengthwise direction of the first piezoelectric material, application to the helical chiral polymer of a shear force caused by tension (stress) acting on the flat planes configuring the micro regions results in the direction of such polarization substantially coinciding with the direction of an electric field generated due to a piezoelectric stress constant $d_{14}$.

Specifically, in polylactic acids for example, in the case of a homopolymer (PLLA) of L-lactic acid having a molecular structure including a left-handed helical structure, application of tension (stress) to a left-handed helically wound structure, in which a first piezoelectric material having a lengthwise direction substantially parallel to the principal orientation direction of the PLLA has been wound around a conductor in a left-handed manner, results in generation of an electric field (polarization) parallel to radial directions and acting in directions from the center of a circle of a circular cross-section perpendicular to the tension toward the outside. Conversely, when tension (stress) has been applied to a right-handed helically wound structure, in which a first piezoelectric material having a lengthwise direction substantially parallel to the principal orientation direction of the PLLA has been wound around a conductor in a right-handed manner, this results in generation of an electric field (polarization) parallel to radial directions, but acting in directions from the outside of a circle of a circular cross-section perpendicular to the tension toward the center thereof.

Moreover, for example, in the case of a homopolymer (PDLA) of D-lactic acid having a molecular structure including a right-handed helical structure, application of tension (stress) to a left-handed helically wound structure, in which a first piezoelectric material having a lengthwise direction substantially parallel to the principal orientation direction of the PDLA has been wound around a conductor in a left-handed manner, results in generation of an electric field (polarization) parallel to radial directions and acting in directions from the outside of a circle of a circular cross-section perpendicular to the tension, toward the center thereof. Conversely, when tension (stress) is applied to a right-handed helically wound structure, in which a first piezoelectric material having a lengthwise direction substantially parallel to the principal orientation direction of the PDLA has been wound around a conductor in a right-handed manner, this results in generation of an electric field (polarization) parallel to radial directions, but acting in directions from the center of a circle of a circular cross-section perpendicular to the tension, toward the outside.

As a result, when tension has been applied to the piezoelectric substrate in the lengthwise direction, a voltage signal proportional to this tension is thought to be effectively detectable due to respective potential differences proportional to the tension being generated at each site of the helically arranged first piezoelectric material in a state of phase alignment.

Therefore, a piezoelectric substrate that is excellent in piezoelectric sensitivity and also excellent in the piezoelectric output stability can be obtained according to the piezoelectric substrate of the present embodiment.

In particular, the stability of piezoelectric sensitivity and the piezoelectric output stability (stability with respect to time or change in temperature) in a piezoelectric substrate using a non-pyroelectric polylactic acid-based polymer as the helical chiral polymer (A) are improved in comparison to those of a piezoelectric substrate using PVDF that has pyroelectric properties.

In the piezoelectric unit provided with a fiber having piezoelectric properties described in JP-A No. 2008-146528, the direction in which the fiber having piezoelectric properties is wound around a conductive fiber is not limited therein, and both origin and direction of force configuring a shear force are different from those of the piezoelectric substrate of the present embodiment. Piezoelectric sensitivity is accordingly thought to be insufficient due to polarization not occurring along the radial directions of the piezoelectric unit. Namely, polarization does not occur in the direction of an electric field generated due to a piezoelectric stress constant $d_{14}$, even in cases in which tension is applied to the piezoelectric unit described in JP-A No. 2008-146528.

The lengthwise direction of the first piezoelectric material and the principal orientation direction of the helical chiral polymer (A) being substantially parallel to each other is advantageous from the perspective of the first piezoelectric material being strong to tension in the lengthwise direction (i.e., has excellent tensile strength in the lengthwise direction). The first piezoelectric material is accordingly not liable to break even when being helically wound in one direction around the conductor.

In addition, the lengthwise direction of the first piezoelectric material and the principal orientation direction of the helical chiral polymer (A) being substantially parallel to each other is also advantageous from the perspective of ease of manufacture when, for example, a stretched piezoelectric film is slit to obtain the first piezoelectric material (for example, a slit ribbon thereof).

Herein, "substantially parallel" indicates that an angle formed between two line segments is from 0° up to but not including 30° (preferably from 0° to 22.5°, more preferably from 0° to 10°, still more preferably from 0° to 5°, and particularly preferably from 0° to 3°).

Herein, the principal orientation direction of the helical chiral polymer (A) means the main orientation direction of the helical chiral polymer (A). The principal orientation direction of the helical chiral polymer (A) can be confirmed by measuring the degree of orientation F of the first piezoelectric material.

In cases in which a raw material is melted and spun before stretching to produce the first piezoelectric material, the principal orientation direction of the helical chiral polymer (A) in the produced first piezoelectric material means the principal stretching direction. The principal stretching direction refers to the direction in which stretching is performed.

Likewise, in cases in which a film is stretched, and slits are made in the stretched film to produce the first piezoelectric material, the principal orientation direction of the helical chiral polymer (A) in the produced first piezoelectric material means a principal stretching direction. The principal stretching direction refers here to the stretching direction in cases of monoaxial stretching, or refers here to the stretching direction having the higher stretching ratio in cases of biaxial stretching.

A first embodiment of the piezoelectric substrate in the present invention will be described in detail below.

(Piezoelectric Substrate of First Embodiment)

In the piezoelectric substrate of the first embodiment, the elongate conductor is preferably an inner conductor, and the elongate first piezoelectric material is preferably helically wound in one direction around the outer peripheral surface of the inner conductor.

Utilizing the inner conductor as the conductor facilitates the helical arrangement of the first piezoelectric material in one direction while maintaining the first piezoelectric material at a helix angle β with respect to the axial direction of the inner conductor.

"Helix angle β" means here an angle formed between the axial direction of the conductor and the arrangement direction of the first piezoelectric material with respect to the axial direction of the conductor (the lengthwise direction of the first piezoelectric material).

This facilitates the generation of polarization of the helical chiral polymer (A) along the radial directions of the piezoelectric substrate when, for example, tension is applied in the lengthwise direction of the piezoelectric substrate. As a result, a voltage signal (charge signal) proportional to the tension is effectively detected as an electrical characteristic.

In addition, a piezoelectric substrate configured as described above has the same structure as the internal structure provided in a coaxial cable (i.e. an inner conductor and a dielectric body). A structure that has high electromagnetic shielding properties and is resistant to noise is accordingly obtained when, for example, the piezoelectric substrate described above is applied to a coaxial cable.

The piezoelectric substrate of the first embodiment preferably further includes an elongate second piezoelectric material helically wound in a direction different from the one direction.

In addition, preferably the second piezoelectric material includes an optically active helical chiral polymer (A), the lengthwise direction of the second piezoelectric material and the principal orientation direction of the helical chiral polymer (A) included in the second piezoelectric material are substantially parallel to each other, the degree of orientation F of the second piezoelectric material, determined from X-ray diffraction measurement by Formula (a), is in a range of from 0.5 up to but not including 1.0, and the chirality of the helical chiral polymer (A) included in the first piezoelectric material and the chirality of the helical chiral polymer (A) included in the second piezoelectric material differ from each other.

Polarization thereby occurs in both the helical chiral polymer (A) included in the first piezoelectric material and the helical chiral polymer (A) included in the second piezoelectric material when, for example, tension has been applied in the lengthwise direction of the piezoelectric substrate. Each of these polarization directions is along the radial directions of the piezoelectric substrate.

As a result, a voltage signal (charge signal) proportional to the tension is more effectively detected. Accordingly, piezoelectric sensitivity and piezoelectric output stability are further improved.

In particular, in cases in which the piezoelectric substrate of the first embodiment includes a first outer conductor and a piezoelectric material formed into a double-layer structure that includes the first piezoelectric material and the second piezoelectric material, the first piezoelectric material and the second piezoelectric material can be brought into close contact with the inner conductor and the first outer conductor so as to form few voids therebetween. This facilitates efficient transmission of an electric field generated by tension to an electrode. Such a form of the piezoelectric material is accordingly well suited to achieving a sensor of higher sensitivity.

From the viewpoint of improving piezoelectric sensitivity and piezoelectric output stability, the piezoelectric substrate of the first embodiment preferably further includes a first insulator helically wound around the outer peripheral surface of the inner conductor, and the first insulator is preferably arranged on the opposite side from the inner conductor as viewed from the first piezoelectric material.

For example, in cases in which the piezoelectric substrate of the first embodiment includes a first outer conductor, gaps are readily formed in the wound first piezoelectric material if the piezoelectric substrate is repeatedly bent or the piezoelectric substrate is bent at a small curvature radius, giving rise to the possibility of the inner conductor and the first outer conductor electrically short-circuiting. Arranging the first insulator in such cases, however, enables the inner conductor and the first outer conductor to be more reliably electrically isolated from each other. This also enables high reliability to be achieved in applications employing a bent piezoelectric substrate.

Preferably the piezoelectric substrate of the first embodiment further includes an elongate second piezoelectric material wound in a direction different from the one direction. Herein, the second piezoelectric material includes an optically active helical chiral polymer (A), a lengthwise direction of the second piezoelectric material and a principal orientation direction of the helical chiral polymer (A) included in the second piezoelectric material are substantially parallel to each other, a degree of orientation F of the second piezoelectric material, determined from X-ray diffraction measurement by Formula (a), is in a range of from 0.5 up to but not including 1.0. The first piezoelectric material and the second piezoelectric material alternately intersect each other to form a braided structure, and a chirality of the helical chiral polymer (A) included in the first piezoelectric material and a chirality of the helical chiral polymer (A) included in the second piezoelectric material differ from each other.

Polarization thereby accordingly occurs in both the helical chiral polymer (A) included in the first piezoelectric material and the helical chiral polymer (A) included in the second piezoelectric material when, for example, tension has been applied in the lengthwise direction of the piezoelectric substrate. Each of these polarization directions is along the radial directions of the piezoelectric substrate.

A voltage signal proportional to the tension is thereby more effectively detected. As a result the piezoelectric sensitivity and piezoelectric output stability are further improved.

In particular, in cases in which the piezoelectric substrate of the first embodiment includes a first outer conductor and a piezoelectric material including the first piezoelectric material and the second piezoelectric material formed into a braided structure, an appropriate level of voids is formed between the first piezoelectric material and the second piezoelectric material. The voids accordingly absorb deformation when a force acts on the piezoelectric material to cause bending deformation therein, facilitating supple bending deformation of the piezoelectric substrate. This thereby enables the piezoelectric substrate of the first embodiment to be suitably used, for example, as a configuration member to be conformed to a three-dimensional plane, such as in a wearable product.

From the viewpoint of improving piezoelectric sensitivity and piezoelectric output stability, the piezoelectric substrate of the first embodiment preferably further includes a first insulator wound around the outer peripheral surface of the inner conductor, wherein the first piezoelectric material and the first insulator alternately intersect each other to form a braided structure.

This makes it easier to maintain a state in which the first piezoelectric material is wound around the inner conductor in one direction when the piezoelectric substrate is undergoing bending deformation. There are preferably no gaps between the first piezoelectric material and the first insulator in the braided structure of such an aspect from the viewpoint that this facilitates the application of tension to the first piezoelectric material.

From the viewpoint of improving piezoelectric sensitivity and piezoelectric output stability, in the piezoelectric substrate of the first embodiment, the first piezoelectric material is preferably wound so as to maintain an angle of from 15° to 75° (45°±30°), and more preferably wound so as to maintain an angle of from 35° to 55° (45°±10°), with respect to the axial direction of the inner conductor.

From the viewpoint of improving piezoelectric sensitivity and piezoelectric output stability, in the piezoelectric substrate of the first embodiment, the first piezoelectric material preferably has a fiber shape that includes a single or plural bundles, and the major axis diameter of a cross-section of the first piezoelectric material is preferably from 0.0001 mm to 10 mm, more preferably from 0.001 mm to 5 mm, and still more preferably from 0.002 mm to 1 mm.

"Major axis diameter of cross-section" is equivalent to "diameter" in cases in which a cross-section of the first piezoelectric material (preferably a fibrous piezoelectric material) has a circular profile.

In cases in which a cross-section of the first piezoelectric material has an irregular profile, the "major axis diameter of cross-section" is the longest width from out of such cross-sectional widths.

In cases in which the first piezoelectric material is a piezoelectric material configured from plural bundles, the "major axis diameter of cross-section" is the major axis diameter of a cross-section of the piezoelectric material configured from the plural bundles.

From the viewpoint of improving the piezoelectric sensitivity and piezoelectric output stability in the piezoelectric substrate of the present embodiment (for example, in the piezoelectric substrate of the first embodiment), the first piezoelectric material preferably has an elongate flat plate shape. The thickness of the first piezoelectric material is from 0.001 mm to 0.2 mm, the width of the first piezoelectric material is from 0.1 mm to 30 mm, and a ratio of the width of the first piezoelectric material to the thickness of the first piezoelectric material is 2 or more.

The dimensions (thickness, width, and ratios (width/thickness, and length/width)) of the first piezoelectric material having an elongate flat plate shape (hereinafter also referred to as "elongate-flat-plate-shaped piezoelectric material") will be described in more detail below.

The first piezoelectric material preferably has a thickness of from 0.001 mm to 0.2 mm.

A thickness of 0.001 mm or more secures the strength of the elongate-flat-plate-shaped piezoelectric material to be secured. This is also excellent in terms of ease of production of the elongate-flat-plate-shaped piezoelectric material.

A thickness of 0.2 mm or less results improves the degrees of freedom for deformation (flexibility) of the elongate-flat-plate-shaped piezoelectric material in the thickness direction.

In addition, the width of the first piezoelectric material is preferably from 0.1 mm to 30 mm.

A width of 0.1 mm or more secures the strength of the first piezoelectric material (elongate-flat-plate-shaped piezoelectric material). This is also excellent in terms of ease of production of the elongate-flat-plate-shaped piezoelectric material (for example, in terms of the ease of production in a slitting process, described later).

A width of 30 mm or less results in improvement in the degrees of freedom for deformation (flexibility) of the elongate-flat-plate-shaped piezoelectric material.

In addition, a ratio of the width of the first piezoelectric material to the thickness of the first piezoelectric material (hereinafter also referred to as "ratio (width/thickness)") is preferably 2 or more.

When the ratio (width/thickness) is 2 or more, the principal faces are clearly defined, thereby facilitating formation of an electrode layer (for example, an outer conductor) having a uniform orientation over the lengthwise direction of the first piezoelectric material (elongate-flat-plate-shaped piezoelectric material). For example, an outer conductor is easily formed on at least one of the principal faces. This is accordingly excellent in terms of piezoelectric sensitivity, and also excellent in terms of the stability of the piezoelectric sensitivity.

The width of the first piezoelectric material is more preferably from 0.5 mm to 15 mm.

When the width is 0.5 mm or more, there is a greater improvement in the strength of the first piezoelectric material (elongate-flat-plate-shaped piezoelectric material). In addition, twisting of the elongate-flat-plate-shaped piezoelectric material can also be better inhibited, thereby enabling the piezoelectric sensitivity and the stability thereof to be further improved.

A width of 15 mm or less results in a greater improvement in the degrees of freedom for deformation (flexibility) of the elongate-flat-plate-shaped piezoelectric material.

The ratio of the length to the width (hereinafter also referred to as "ratio (length/width)") of the first piezoelectric material is preferably 10 or more.

When the ratio (length/width) is 10 or more, there is a greater improvement in the degrees of freedom for deformation (flexibility) of the first piezoelectric material (elongate-flat-plate-shaped piezoelectric material). In addition, piezoelectric properties can be imparted more extensively to a piezoelectric device (such as a piezoelectric textile or a piezoelectric fabric) in which elongate-flat-plate-shaped piezoelectric materials are appropriately employed.

In the piezoelectric substrate of the present embodiment, a functional layer is preferably arranged on at least one principal face of the first piezoelectric material from the viewpoint of improving the piezoelectric sensitivity and piezoelectric output stability in cases in which the first piezoelectric material has an elongate flat plate shape.

The functional layer preferably includes at least one of an adhesion facilitation layer, a hard coat layer, an antistatic layer, an antiblock layer, a protective layer, or an electrode layer.

This further facilitates application to, for example, a piezoelectric device (such as a piezoelectric textile or a piezoelectric fabric), a force sensor, an actuator, or a biodata acquisition device.

The functional layer preferably includes an electrode layer.

This enables a connection between the first outer conductor and the conductor (preferably an inner conductor) to be more easily made in cases in which the piezoelectric substrate is being employed as one of the configuration elements of, for example, a piezoelectric device (such as a piezoelectric textile or a piezoelectric fabric), a force sensor, an actuator, or a biodata acquisition device. This facilitates detection of a voltage signal corresponding to tension when tension has been applied to the piezoelectric substrate of the present embodiment.

In the piezoelectric substrate of the present embodiment, preferably at least one surface layer of a layered body including the first piezoelectric material and the functional layer is the electrode layer.

This enables a connection between the first outer conductor or the conductor (preferably an inner conductor) and the layered body to be more easily made in cases in which the piezoelectric substrate is being employed as one of the configuration elements of, for example, a piezoelectric device (such as a piezoelectric textile or a piezoelectric fabric), a force sensor, an actuator, or a biodata acquisition device. This facilitates detection of a voltage signal corresponding to tension when tension has been applied to the piezoelectric substrate of the present embodiment.

In the piezoelectric substrate of the present embodiment, the conductor is preferably a tinsel wire.

The form of the tinsel wire has a structure in which a rolled copper foil is helically wound around a fiber. Employing copper that has a high electric conductivity enables the output impedance to be decreased. This facilitates detection of a voltage signal corresponding to tension when tension has been applied to the piezoelectric substrate of the present embodiment. As a result, piezoelectric sensitivity and piezoelectric output stability are further improved.

The piezoelectric substrate of the present embodiment preferably includes an adhesive layer between the conductor and the first piezoelectric material.

The relative position of the conductor and the first piezoelectric material is thereby inhibited from shifting, facilitating application of tension to the first piezoelectric material, and facilitating application of a shear stress to the helical chiral polymer (A) included in the first piezoelectric material. This enables a voltage output proportional to the tension to be effectively detected from the conductor (preferably a signal line conductor). The inclusion of the adhesive layer results in a further increase in the absolute value of the amount of generated charge per unit tensile force.

In the piezoelectric substrate of the present embodiment, the helical chiral polymer (A) included in the first piezoelectric material is preferably a polylactic acid-based polymer having a main chain including a repeating unit represented by the following Formula (1), from the viewpoint of further improving piezoelectric properties.

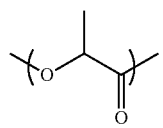

(1)

In the piezoelectric substrate of the present embodiment, the helical chiral polymer (A) included in the first piezoelectric material preferably has an optical purity of 95.00% ee or more, from the viewpoint of further improving piezoelectric properties.

In the piezoelectric substrate of the present embodiment, the helical chiral polymer (A) included in the first piezoelectric material is preferably D-form or L-form, from the viewpoint of further improving piezoelectric properties.

In the piezoelectric substrate of the present embodiment, the content of the helical chiral polymer (A) included in the first piezoelectric material is preferably 80% by mass or more with respect to the total amount of the first piezoelectric material, from the viewpoint of further improving piezoelectric properties.

The piezoelectric substrate of the present embodiment preferably further includes a first outer conductor at an outer periphery.

"Outer periphery" here means an outer peripheral portion of the piezoelectric substrate.

This enables electrostatic shielding to be achieved, and for fluctuations in the voltage of the conductor (preferably an inner conductor) arising from the effects of external static electricity to be suppressed.

The piezoelectric substrate of the present embodiment preferably further includes a second insulator at the outer periphery of the first outer conductor.

Due to the piezoelectric substrate of the present embodiment including the second insulator, the ingress of liquids such as water or sweat, and the ingress of dust or the like, from outside can be suppressed. This enables generation of leakage current between the conductor (preferably an inner conductor) and the outer conductor, caused by water, sweat, dust, or the like, to be suppressed. As a result, this enables a stable output to be achieved that is robust to various environmental changes and is not liable to fluctuate in sensitivity, in cases in which the piezoelectric substrate is used as one of the configuration elements of, for example, a piezoelectric device (such as a piezoelectric textile or a piezoelectric fabric), a force sensor, an actuator, or a biodata acquisition device.

A specific aspect A of the piezoelectric substrate according to the first embodiment will be described below, with reference to the drawings.

(Specific Aspect A)

Figure 2A:
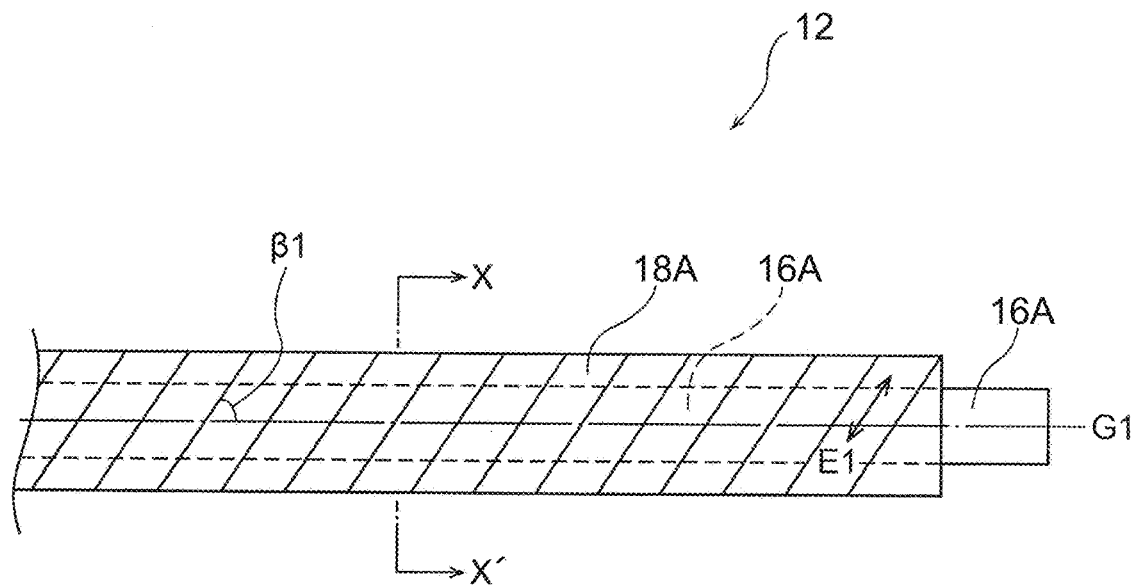
FIG. 2A is a side view illustrating a specific aspect A of a piezoelectric substrate according to the first embodiment.
Figure 2B:
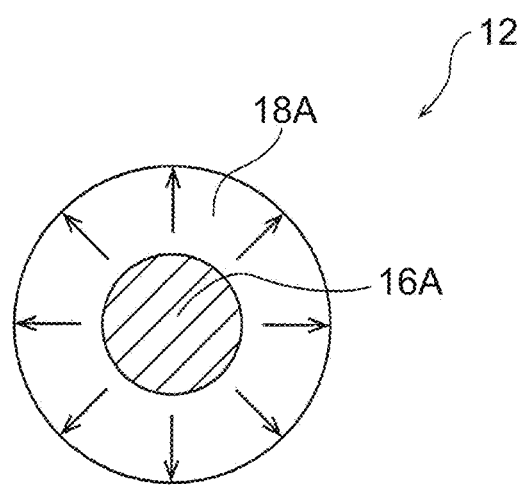
FIG. 2B is a cross-section taken along line X-X' of FIG. 2A.

FIG. 2A is a side view illustrating the specific aspect A of the piezoelectric substrate according to the first embodiment. FIG. 2B is a cross-section taken along the line X-X' of FIG. 2A.

A piezoelectric substrate 12 of the specific aspect A includes an elongate inner conductor 16A as the conductor, an elongate first piezoelectric material 18A, and an adhesive layer (not illustrated) interposed between the inner conductor 16A and the first piezoelectric material 18A.

As illustrated in FIG. 2A, the first piezoelectric material 18A is helically wound at a helix angle β1 around the outer peripheral surface of the inner conductor 16A in one direction from one end to the other end thereof so that there is no gap present therebetween.

"Helix angle β1" means an angle formed between an axial direction G1 of the inner conductor 16A and the arrangement direction of the first piezoelectric material 18A with respect to the axial direction of the inner conductor 16A.

In the specific aspect A, the first piezoelectric material 18A is wound in a left-handed manner around the inner conductor 16A. Specifically, the first piezoelectric material 18A is wound in a left-handed manner from the near side to the far side of the inner conductor 16A when the piezoelectric substrate 12 is viewed from one axial direction end of the inner conductor 16A (at the right end side in FIG. 2A).

In FIG. 2A, the principal orientation direction of the helical chiral polymer (A) included in the first piezoelectric material 18A is indicated by the double-headed arrow E1. In other words, the principal orientation direction of the helical chiral polymer (A) and the arrangement direction of the first piezoelectric material 18A (the lengthwise direction of the first piezoelectric material 18A) are substantially parallel to each other.

The adhesive layer (not illustrated) is interposed between the inner conductor 16A and the first piezoelectric material 18A. The piezoelectric substrate 12 of the specific aspect A is thereby configured so that the relative position of the first piezoelectric material 18A and the inner conductor 16A does not shift even when tension is applied to the piezoelectric substrate 12 in the lengthwise direction thereof.

The operation and advantageous effects of the piezoelectric substrate 12 of the specific aspect A will be described below.

For example, when tension is applied to the piezoelectric substrate 12 in the lengthwise direction thereof, a shear force is applied to the helical chiral polymer (A) included in the first piezoelectric material 18A, thereby polarizing the helical chiral polymer (A). The polarization of the helical chiral polymer (A) is thought to occur along the radial directions of the piezoelectric substrate 12, as indicated by the arrows in FIG. 2B, with the polarization occurring in-phase with each other. As a result, a voltage signal proportional to the tension is effectively detected.

Furthermore, in the piezoelectric substrate 12 of the specific aspect A, tension is more readily applied to the first piezoelectric material 18A due to the adhesive layer being interposed between the inner conductor 16A and the first piezoelectric material 18A.

Due to the above configuration, the piezoelectric substrate 12 of the specific aspect A is excellent in piezoelectric sensitivity and is excellent in piezoelectric output stability.

A specific aspect B of the piezoelectric substrate according to the first embodiment will now be described, with reference to the drawings. In the following description, configuration the same as the specific aspect A is appended with the same reference signs, and duplicate description is omitted thereof.

(Specific Aspect B)

Figure 3:
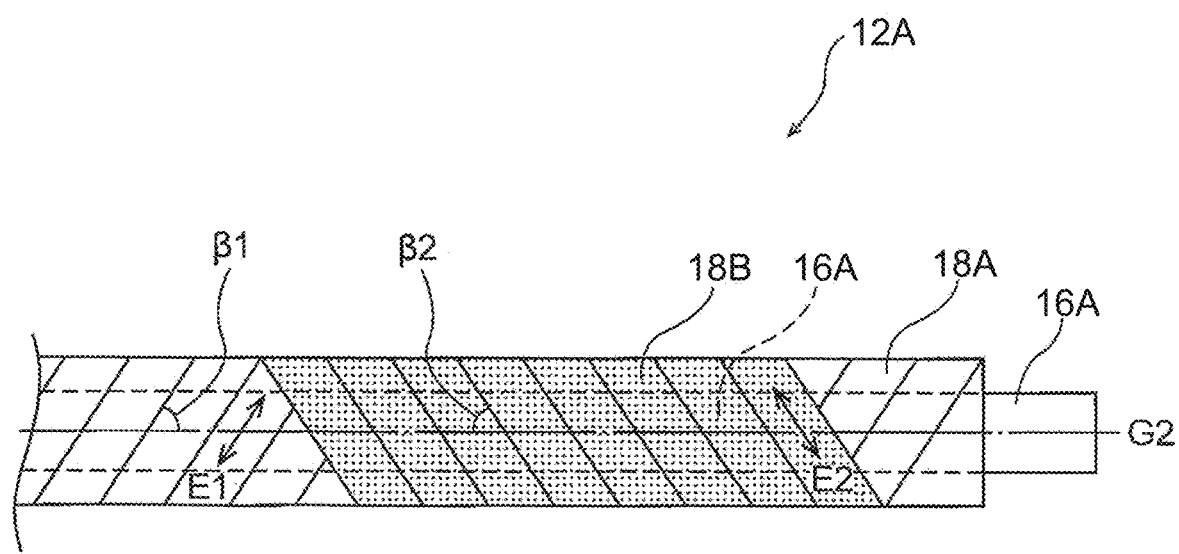
FIG. 3 is a side view illustrating a specific aspect B of a piezoelectric substrate according to the first embodiment.

FIG. 3 is a side view illustrating the specific aspect B of the piezoelectric substrate according to the first embodiment.

A piezoelectric substrate 12A of the specific aspect B differs from the piezoelectric substrate 12 of the first aspect in including an elongate second piezoelectric material 18B.

The chirality of the helical chiral polymer (A) included in the first piezoelectric material 18A and the chirality of a helical chiral polymer (A) included in the second piezoelectric material 18B differ from each other.

Similarly to in the specific aspect A, the first piezoelectric material 18A is helically wound at a helix angle β1 around the outer peripheral surface of the inner conductor 16A in one direction from one end to the other end so that there are no gaps present therebetween.

However, the second piezoelectric material 18B is helically wound in the reverse direction to the direction of winding the first piezoelectric material 18A at a helix angle β2, which is substantially the same angle as the helix angle β1, around the outer peripheral surface of the first piezoelectric material 18A, as illustrated in FIG. 3.

"Helix angle β2" is defined in a similar manner to the helix angle β1 described above.

The "reverse direction to the direction of winding of the first piezoelectric material 18A" in the specific aspect B refers here to being right-handed. In other words, the second piezoelectric material 18B is wound in a right-handed manner from the near side to the far side of the inner conductor 16A when the piezoelectric substrate 12A is viewed from one end in an axial direction G2 of the inner conductor 16A (at the right end side in FIG. 3).

In FIG. 3, the principal orientation direction of the helical chiral polymer (A) included in the second piezoelectric material 18B is indicated by the double-headed arrow E2. In other words, the principal orientation direction of the helical chiral polymer (A) included in the second piezoelectric material 18B and the arrangement direction of the second piezoelectric material 18B (the lengthwise direction of the second piezoelectric material 18B) are substantially parallel to each other.

The operation of the piezoelectric substrate 12A of the specific aspect B will be described below.

For example, when tension is applied to the piezoelectric substrate 12A in the lengthwise direction thereof, a shear stress is applied to both the helical chiral polymer (A) included in the first piezoelectric material 18A and the helical chiral polymer (A) included in second piezoelectric material 18B, and polarization accordingly occurs therein.

Each of the polarization directions is along the radial directions of the piezoelectric substrate 12A. A voltage signal proportional to the tension is accordingly effectively detected.

Due to the above configuration, the piezoelectric substrate 12A of the specific aspect B achieves greater improvements in the piezoelectric sensitivity and piezoelectric output stability.

In particular, in cases in which the piezoelectric substrate 12A of the specific aspect B includes an outer conductor, due to the piezoelectric material including the first piezoelectric material and the second piezoelectric material formed in a double-layer structure, this enables the first piezoelectric material and the second piezoelectric material to be brought into close contact with the inner conductor and the outer conductor so as to form few voids therebetween. This facilitates efficient transmission of an electric field generated by tension to an electrode. Such a form of the piezoelectric material is accordingly well suited to achieving a sensor of higher sensitivity.

A specific aspect C of the piezoelectric substrate according to the first embodiment will now be described, with reference to the drawings. In the following description, the same reference signs are appended to the same configuration as that in the specific aspect A and the specific aspect B, and duplicate explanation thereof will be omitted.

(Specific Aspect C)

Figure 4:
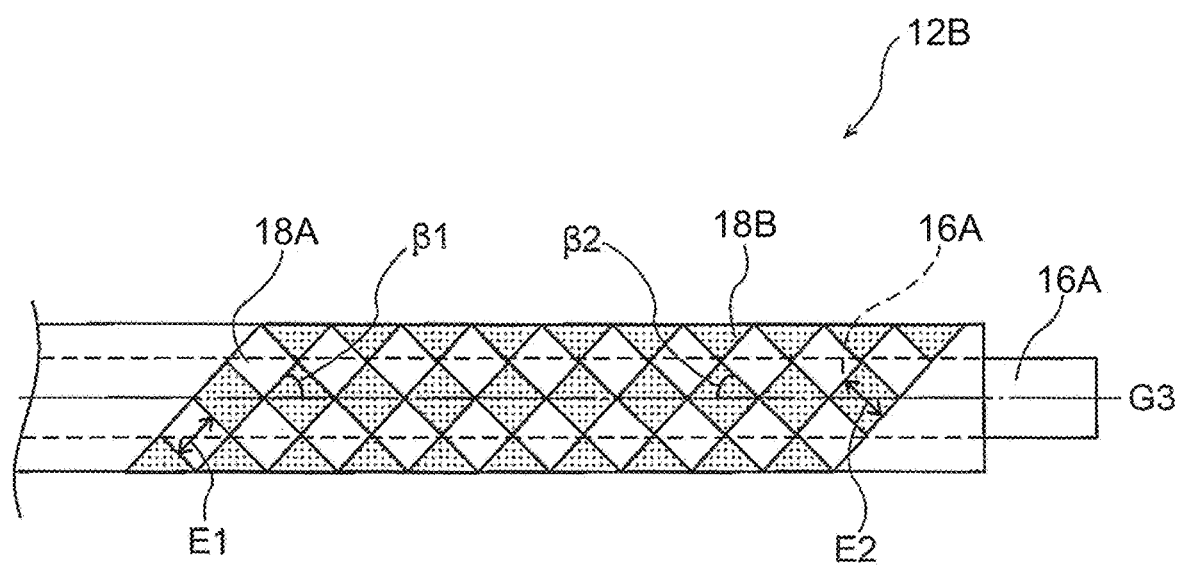
FIG. 4 is a side view illustrating a specific aspect C of a piezoelectric substrate according to the first embodiment.

FIG. 4 is a side view illustrating a specific aspect C of the piezoelectric substrate according to the first embodiment.

A piezoelectric substrate 12B of the specific aspect C differs from the piezoelectric substrate 12A of the specific aspect B in that a first piezoelectric material 18A and a second piezoelectric material 18B alternately intersect each other to form a braided structure.

The chirality of a helical chiral polymer (A) included in the first piezoelectric material 18A and the chirality of a helical chiral polymer (A) included in the second piezoelectric material 18B differ from each other.

As illustrated in FIG. 4, in the piezoelectric substrate 12B of the specific aspect C, the first piezoelectric material 18A is helically wound in a left-handed manner at a helix angle β1 with respect to an axial direction G3 of an inner conductor 16A, and the second piezoelectric material 18B is helically wound in a right-handed manner at a helix angle β2 with respect thereto. The first piezoelectric material 18A and the second piezoelectric material 18B alternately intersect each other.

In the braided structure illustrated in FIG. 4, the principal orientation direction (double-headed arrow E1) of the helical chiral polymer (A) included in first piezoelectric material 18A and the arrangement direction of the first piezoelectric material 18A are substantially parallel to each other. Similarly, the principal orientation direction (double-headed arrow E2) of the helical chiral polymer (A) included in the second piezoelectric material 18B and the arrangement direction of the second piezoelectric material 18B are substantially parallel to each other.

The operation and advantageous effects of the piezoelectric substrate 12B of the specific aspect C will be described below.

Similarly to in the specific aspect B, polarization occurs in both of the helical chiral polymer (A) included in the first piezoelectric material 18A and the helical chiral polymer (A) included in second piezoelectric material 18B when, for example, tension is applied to the piezoelectric substrate 12B in the lengthwise direction thereof. Each of the polarization directions is along the radial directions of the piezoelectric substrate 12B. As a result, a voltage signal proportional to the tension is effectively detected.

Due to the above configuration, the piezoelectric substrate 12B of the specific aspect C results achieves a greater improvement in piezoelectric sensitivity and piezoelectric output stability.

In particular, in cases in which the piezoelectric substrate 12B of the specific aspect C includes an outer conductor, when tension has been applied in the lengthwise direction of the piezoelectric substrate 12B, a shear stress is applied to the left-hand-wound first piezoelectric material and the right-hand-wound second piezoelectric material forming the braided structure. The polarization directions thereof are aligned with each other, a volume fraction contributing to the piezoelectric performance of the insulator (i.e., the first piezoelectric material and the second piezoelectric material) between the inner conductor and the outer conductor is increased, and the piezoelectric performance is therefore further improved. This thereby enables the piezoelectric substrate 12B of the specific aspect C to be suitably used, for example, as a configuration member to be conformed to a three-dimensional plane, such as in a wearable product.

The conductor, the first piezoelectric material, and the like included in the piezoelectric substrate of the present embodiment will be described below.

<Conductor>

The piezoelectric substrate of the present embodiment includes an elongate conductor.

The conductor (for example, an inner conductor) in the present embodiment is preferably a signal line conductor.

The signal line conductor refers to a conductor for efficiently detecting an electrical signal from the first piezoelectric material or the second piezoelectric material. Specifically, the signal line conductor is a conductor for detecting a voltage signal (charge signal) corresponding to tension applied when tension has been applied to the piezoelectric substrate of the present embodiment.

The conductor is preferably a good electrical conductor. Examples that may be employed as the conductor include a copper wire, an aluminum wire, an SUS wire, a metal wire coated with an insulating covering layer, a carbon fiber, a resin fiber integrated with a carbon fiber, a tinsel wire, an organic conductive material, and the like. The tinsel wire refers to a wire formed by spirally winding a copper foil around a fiber. Among such conductors, a tinsel wire and a carbon fiber are preferred from the viewpoint of improving piezoelectric sensitivity and piezoelectric output stability, and imparting high flexibility.

In particular, a tinsel wire is preferably used in an application having low electrical resistivity and requiring flexibility and pliability (for example, an application such as a wearable sensor built into clothing).

A carbon fiber is preferably used in processing applications to produce textiles or fabrics that demand very high flexibility and suppleness (for example, a piezoelectric textile, a piezoelectric fabric, or a piezoelectric sensor (a textile-form piezoelectric sensor or a fabric-form piezoelectric sensor)).

Suppleness and high flexibility are demanded in cases in which the piezoelectric substrate of the present embodiment is used as a fiber to be processed into a piezoelectric textile or a piezoelectric fabric. A yarn-form or fibrous signal line conductor is preferred in such applications. A piezoelectric substrate including a yarn-form or fibrous signal line conductor has high flexibility, and is therefore well suited to processing with a weaving machine or a knitting machine.

<First Piezoelectric Material>

The piezoelectric substrate of the present embodiment includes the elongate first piezoelectric material.

The first piezoelectric material is a piezoelectric material including an optically active helical chiral polymer (A).

(Helical Chiral Polymer (A))

The first piezoelectric material in the present embodiment includes an optically active helical chiral polymer (A).

Here, "optically active helical chiral polymer" refers to a polymer having a helical molecular structure and having molecular optical activity.

Examples of the helical chiral polymer (A) include polypeptides, cellulose derivatives, polylactic acid-based polymers, polypropylene oxide, and poly(β-hydroxybutyric acid).

Examples of the polypeptides include poly(glutaric acid γ-benzyl) and poly(glutaric acid γ-methyl).

Examples of the cellulose derivatives include cellulose acetate and cyanoethyl cellulose.

From the viewpoint of improving the piezoelectric properties of the first piezoelectric material, the helical chiral polymer (A) preferably has an optical purity of 95.00% ee or more, more preferably 96.00% ee or more, still more preferably 99.00% ee or more, and even more preferably 99.99% ee or more. The helical chiral polymer (A) desirably has an optical purity of 100.00% ee. Adopting an optical purity of the helical chiral polymer (A) in the above ranges raises the ease-of-packing of polymer crystals that exhibit piezoelectric properties, and this is thought to consequently result in improved piezoelectric properties.

The optical purity of the helical chiral polymer (A) referred to here is a value calculated by the following Formula.

Optical purity (% ee)=100×|L-form amount−D-form amount|/(L-form amount+D-form amount)

In other words, the optical purity of the helical chiral polymer (A) is a value obtained by multiplying by "100" (by obtaining the product by 100 of) "a numerical value obtained by dividing (by obtaining the quotient of) 'the difference (absolute value) between the amount (mass %) of helical chiral polymer (A) in L-form and the amount (mass %) of helical chiral polymer (A) in D-form' by 'the total amount of the amount (mass %) of helical chiral polymer (A) in L-form and the amount (mass %) of helical chiral polymer (A) in D-form'".

Values obtained by a high performance liquid chromatography (HPLC) method are employed for the amount (mass %) of helical chiral polymer (A) in L-form and the amount (mass %) of helical chiral polymer (A) in D-form. The details of specific measurement will be described later.

A polymer having a main chain including a repeating unit represented by the following Formula (1) is preferably employed as the helical chiral polymer (A) from the viewpoint of increasing the optical purity and improving the piezoelectric properties.

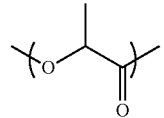

(1)

Examples of the polymer having a main chain including a repeating unit represented by the above Formula (1) include a polylactic acid-based polymer.

Polylactic acid-based polymer refers here to "polylactic acid (a polymer consisting of a repeating unit derived from a monomer selected from L-lactic acid or D-lactic acid)", "a copolymer of L-lactic acid or D-lactic acid and a compound copolymerizable with the L-lactic acid or D-lactic acid", or a mixture thereof.

Among such polylactic acid-based polymers, polylactic acid is preferred, and a homopolymer (PLLA, also simply referred to as "L-form") of L-lactic acid or a homopolymer (PDLA, also simply referred to as "D-form") of D-lactic acid is most preferred.

Polylactic acid is a polymer obtained by polymerizing lactic acid by ester bonding so as to connect together in a long polymer.

Known methods capable of producing polylactic acid include a lactide method involving lactide, a direct polymerization method in which lactic acid is heated in a solvent under reduced pressure so as to be polymerized while removing water, and the like.

Examples of the polylactic acid include a homopolymer of L-lactic acid, a homopolymer of D-lactic acid, a block copolymer including a polymer of at least one of L-lactic acid or D-lactic acid, or a graft copolymer including a polymer of at least one of L-lactic acid or D-lactic acid.

Examples of the "compound copolymerizable with L-lactic acid or D-lactic acid" include: a hydroxycarboxylic acid such as glycolic acid, dimethyl glycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethyl caproic acid, and mandelic acid; a cyclic ester such as glycolide, β-methyl-δ-valerolactone, γ-valerolactone, and ε-caprolactone; a polycarboxylic acid such as oxalic acid, malonic acid, succinic acid, glutaric acid, adipic acid, pimelic acid, azelaic acid, sebacic acid, undecanedioic acid, dodecanedioic acid, terephthalic acid, and an anhydride thereof; a polyalcohol such as ethylene glycol, diethylene glycol, triethylene glycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, and 1,4-hexanedimethanol; a polysaccharide such as cellulose; an aminocarboxylic acid such as α-amino acid; and the like.

Examples of the "copolymer of L-lactic acid or D-lactic acid and a compound copolymerizable with the L-lactic acid or the D-lactic acid" include a block copolymer or a graft copolymer having a polylactic acid sequence capable of forming a helical crystal.

The concentration of a copolymer component derived structure in the helical chiral polymer (A) is preferably 20 mol % or less.

For example, in cases in which the helical chiral polymer (A) is a polylactic acid-based polymer, the concentration of the copolymer component derived structure is preferably 20 mol % or less with respect to the total number of moles in the polylactic acid-based polymer of a lactic acid derived structure and a structure derived from the compound copolymerizable with lactic acid (copolymer component).

Examples of methods capable of producing the polylactic acid-based polymer include, for example: a method of obtaining the polymer by direct dehydration condensation of lactic acid, described in JP-A No. S59-096123 and JP-A No. H7-033861; a method of obtaining the polymer by ring-opening polymerization of lactide which is a cyclic dimer of lactic acid, described in U.S. Pat. No. 2,668,182; and the like.

Moreover, in order to achieve an optical purity of 95.00% ee or more in the polylactic acid-based polymer obtained by the above production methods, lactide having an optical purity improved by crystallization operations to an optical purity of 95.00% ee or more is preferably polymerized when, for example, a polylactic acid is produced by a lactide method.

—Weight Average Molecular Weight—

The weight average molecular weight (Mw) of the helical chiral polymer (A) is preferably from 50,000 to 1,000,000.

The mechanical strength of the first piezoelectric material is improved by making the Mw of the helical chiral polymer (A) 50,000 or more. The above Mw is preferably 100,000 or more, and is still more preferably 200,000 or more.

When obtaining the first piezoelectric material by molding (for example, extrusion molding or melt spinning), the moldability is improved by making the Mw of the helical chiral polymer (A) 1,000,000 or less. The Mw is preferably 800,000 or less, and is still more preferably 300,000 or less.

From the viewpoint of improving the strength of the first piezoelectric material, the molecular weight distribution (Mw/Mn) of the helical chiral polymer (A) is preferably from 1.1 to 5, and more preferably from 1.2 to 4. From 1.4 to 3 is still more preferable therefor.

The weight average molecular weight (Mw) and the molecular weight distribution (Mw/Mn) of the helical chiral polymer (A) refer to values measured using a gel permeation chromatograph (GPC). Mn here is the number-average molecular weight of the helical chiral polymer (A).

An example of a method of measuring Mw and Mw/Mn of the helical chiral polymer (A) using GPC will be described below.

—GPC Measurement Apparatus—

GPC-100, manufactured by Waters Corp.

—Column—

SHODEX LF-804, manufactured by Showa Denko K.K.

—Preparation of Sample—

The first piezoelectric material is dissolved in a solvent (for example, chloroform) at 40° C. to prepare a sample solution having a concentration of 1 mg/mL.

—Measurement Conditions—

0.1 mL of the sample solution is introduced into a column at a temperature of 40° C. and a flow rate of 1 mL/min using chloroform as a solvent.

The concentration of the sample in the sample solution separated by the column is measured by a differential refractometer.

A universal calibration curve is established based on a polystyrene standard sample, and the weight average molecular weight (Mw) and the molecular weight distribution (Mw/Mn) of the helical chiral polymer (A) are calculated.

A commercially available polylactic acid may be used as the polylactic acid-based polymer, serving as an example of the helical chiral polymer (A).

Examples of the commercially available product include PURASORB (PD, PL) manufactured by PURAC Inc., LACEA (H-100, H-400) manufactured by Mitsui Chemical Inc., and INGEO™ BIOPOLYMER manufactured by NatureWorks LLC.

In cases in which a polylactic acid-based polymer is used as the helical chiral polymer (A), the polylactic acid-based polymer is preferably produced by a lactide method or a direct polymerization method in order to achieve a weight average molecular weight (Mw) of the polylactic acid-based polymer of 50,000 or more.

The first piezoelectric material in the present embodiment may contain one kind of such a helical chiral polymer (A) as described above alone, or may contain two or more kinds thereof.

The content of the helical chiral polymer (A) in the first piezoelectric material in the present embodiment (total content when two or more kinds thereof) is preferably 80% by mass or more with respect to the total amount of the first piezoelectric material.

<Stabilizer>

The first piezoelectric material preferably further includes a stabilizer (B) having in one molecule one or more kinds of functional group selected from the group consisting of a carbodiimide group, an epoxy group, and an isocyanate group, and having a weight average molecular weight of from 200 to 60,000. This enables a moist heat resistance thereof to be further improved.

"Stabilizer (B)" described in the paragraphs 0039 to 0055 of WO 2013/054918 may be used as the stabilizer (B).

Examples of compounds including a carbodiimide group in one molecule (carbodiimide compound) that may be used as the stabilizer (B) include a monocarbodiimide compound, a polycarbodiimide compound, and a cyclic carbodiimide compound.

Preferred examples of the monocarbodiimide compound include dicyclohexylcarbodiimide and bis-2,6-diisopropylphenylcarbodiimide.

Polycarbodiimide compounds produced by various methods may be used as such polycarbodiimide compounds. Polycarbodiimide compounds produced by conventional methods for producing polycarbodiimides (for example as described in U.S. Pat. No. 2,941,956, Japanese Patent Publication (JP-B) No. S47-33279, and J. Org. Chem. 28, pp 2069-2075 (1963), Chemical Review 1981, Vol. 81 No. 4, pp 619-621) may be used therefor. Specifically, a carbodiimide compound described in Japanese Patent No. 4084953 may also be used therefor.

Examples of the polycarbodiimide compound include poly(4,4'-dicyclohexylmethanecarbodiimide), poly(N,N'-di-2,6-diisopropylphenylcarbodiimide), and poly(1,3,5-triisopropylphenylene-2,4-carbodiimide).

The cyclic carbodiimide compound can be synthesized by following, for example, a method described in JP-A No. 2011-256337.

A commercially available product may be used as the carbodiimide compound. Examples thereof include B2756 (trade name) manufactured by Tokyo Chemical Industry Co., Ltd., CARBODILITE LA-1 (trade name) manufactured by Nisshinbo Chemical Inc., and STABAXOL P, STABAXOL P400, and STABAXOL I (each being a trade name) manufactured by Rhein Chemie Rheinau Gmbh.

Examples of a compound (isocyanate compound) that may be used as the stabilizer (B) and includes an isocyanate group in one molecule include 3-(triethoxysilyl)propyl isocyanate, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, xylylene diisocyanate, hydrogenated xylylene diisocyanate, and isophorone diisocyanate.

Examples of a compound (epoxy compound) that may be used as the stabilizer (B) and includes an epoxy group in one molecule include phenylglycidyl ether, diethylene glycol diglycidyl ether, bisphenol-A-diglycidyl ether, hydrogenated bisphenol-A-diglycidyl ether, phenol novolac type epoxy resin, cresol novolac type epoxy resin, and epoxidized polybutadiene.

The weight average molecular weight of the stabilizer (B) is from 200 to 60,000 as described above, is more preferably from 200 to 30,000, and is still more preferably from 300 to 18,000.

Achieving a molecular weight within the above range results in the stabilizer (B) moving more easily, and in a moist heat resistance improvement effect being more effectively exhibited.

The weight average molecular weight of the stabilizer (B) is particularly preferably from 200 to 900. Note that a weight average molecular weight being from 200 to 900 is substantially the same as a number-average molecular weight being from 200 to 900. When the weight average molecular weight is from 200 to 900, the molecular weight distribution thereof is sometimes 1.0. A "weight average molecular weight of from 200 to 900" may also simply be referred to as a "molecular weight of from 200 to 900" in such cases.

In cases in which the first piezoelectric material contains the stabilizer (B), the first piezoelectric material may contain one kind of a stabilizer alone, or may contain two or more kinds thereof.

In cases in which the first piezoelectric material includes the stabilizer (B), the content of the stabilizer (B) is preferably from 0.01 parts by mass to 10 parts by mass, more preferably from 0.01 parts by mass to 5 parts by mass, still more preferably from 0.1 parts by mass to 3 parts by mass, and particularly preferably from 0.5 parts by mass to 2 parts by mass, with respect to 100 parts by mass of the helical chiral polymer (A).

Achieving a content as described above of 0.01 parts by mass or more results in a further improvement in moist heat resistance.

Achieving a content as described above of 10 parts by mass or less results in a deterioration of transparency being further suppressed.

An example of a preferred aspect of the stabilizer (B) includes an aspect in which a stabilizer (B1) including one or more kinds of functional group selected from the group consisting of a carbodiimide group, an epoxy group, and an isocyanate group and having a number-average molecular weight of from 200 to 900, is combined with a stabilizer (B2) including two or more functional groups in a molecule that are one or more kinds of functional group selected from the group consisting of a carbodiimide group, an epoxy group, and an isocyanate group and having a weight average molecular weight of from 1000 to 60,000. The weight average molecular weight of the stabilizer (B1) having a number-average molecular weight of from 200 to 900 is approximately from 200 to 900. The number-average molecular weight and the weight average molecular weight of the stabilizer (B1) are values which are substantially the same as each other.

In cases in which the stabilizer (B1) and the stabilizer (B2) are employed in combination as the stabilizer, a larger amount of stabilizer (B1) is preferably included therein from the viewpoint of improving transparency.

Specifically, with respect to 100 parts by mass of the stabilizer (B1), the amount of stabilizer (B2) is preferably in a range of from 10 parts by mass to 150 parts by mass from the viewpoint of achieving both transparency and moist heat resistance, and is more preferably in a range of from 50 parts by mass to 100 parts by mass.

Specific examples (stabilizers B-1 to B-3) of the stabilizer (B) are described below.

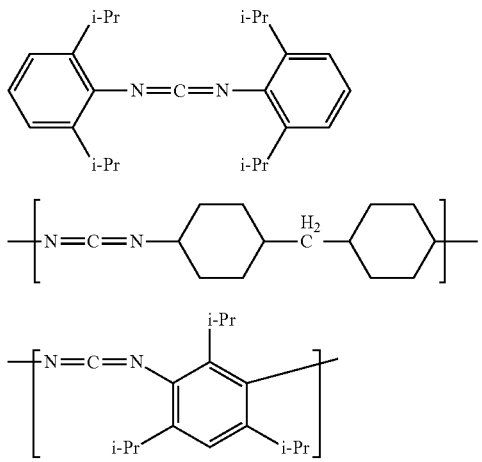

Compound names, commercially available products, and the like for the stabilizers B-1 to B-3 will be described below.

Stabilizer B-1: The compound name thereof is bis-2,6-diisopropylphenylcarbodiimide. The weight average molecular weight thereof (which is simply equivalent to "molecular weight" in this example) is 363. Examples of the commercially available products thereof include "STABAXOL I" manufactured by Rhein Chemie Rheinau Gmbh, and "B2756" manufactured by Tokyo Chemical Industry Co., Ltd.

Stabilizer B-2: The compound name thereof is poly(4,4'-dicyclohexylmethanecarbodiimide). Examples of the commercially available products thereof include "CARBODILITE LA-1" manufactured by Nisshinbo Chemical Inc., as a product having a weight average molecular weight of about 2000.

Stabilizer B-3: The compound name thereof is poly(1,3,5-triisopropylphenylene-2,4-carbodiimide). Examples of the commercially available products thereof include "STABAXOL P" manufactured by Rhein Chemie Rheinau Gmbh, as a product having a weight average molecular weight of about 3000. There is also "STABAXOL P400" manufactured by Rhein Chemie Rheinau Gmbh, as a product having a weight average molecular weight of 20,000.

<Other Components>

The first piezoelectric material may include another component, if necessary.

Examples of such other components include: known resins such as polyvinylidene fluoride, a polyethylene resin, and a polystyrene resin; known inorganic fillers such as silica, hydroxyapatite, and montmorillonite; known crystal nucleating agents such as phthalocyanine; and stabilizers other than the stabilizer (B).

Examples of such inorganic fillers and crystal nucleating agents include components described in the paragraphs 0057 to 0058 of WO 2013/054918.

(Degree of Orientation F)

The degree of orientation F of the first piezoelectric material in the present embodiment is, as described above, from 0.5 up to but not including 1.0, preferably from 0.7 up to but not including 1.0, and more preferably from 0.8 up to but not including 1.0.

Adopting a degree of orientation F of the first piezoelectric material of 0.5 or more results in a large number of molecular chains of the helical chiral polymer (A) (for example, the molecular chains of polylactic acid) being arranged in the stretching direction. This results in a high ratio of oriented crystals being generated, and enables higher piezoelectric properties to be exhibited.

Longitudinal cleavage strength is further improved when the degree of orientation F of the first piezoelectric material is less than 1.0.

(Degree of Crystallinity)

The degree of the crystallinity of the first piezoelectric material in the present embodiment is a value measured by the above X-ray diffraction measurement (wide-angle x-ray diffraction measurement).

The degree of crystallinity of the first piezoelectric material in the present embodiment is preferably from 20% to 80%, more preferably from 25% to 70%, and still more preferably from 30% to 60%.

High piezoelectric properties are maintained by adopting a degree of crystallinity of 20% or more. A high transparency is maintained in the first piezoelectric material by adopting a degree of crystallinity of 80% or less.

Adopting a degree of crystallinity of 80% or less facilitates production of the first piezoelectric material, due to whitening or breaking being less likely to occur when, for example, the first piezoelectric material is being produced by stretching a piezoelectric film that serves as raw material therefor. Adopting a degree of crystallinity of 80% or less results in a fiber with high flexibility and suppleness characteristics in cases in which, for example, production is performed by stretching a raw material for the first piezoelectric material (for example, polylactic acid) after melt spinning, thereby enabling the first piezoelectric material to be easily produced.

(Transparency (Internal Haze))

Transparency is not particularly required for the first piezoelectric material in the present embodiment, but the first piezoelectric material may, of course, have transparency.

The transparency of the first piezoelectric material can be evaluated by measuring an internal haze. The internal haze of the first piezoelectric material referred to here refers to a haze obtained by excluding haze caused by the profile of the outer surface of the first piezoelectric material.

When there are requirements for transparency, the internal haze for visible light of the first piezoelectric material is preferably 5% or less, and, from the viewpoint of further improving transparency and longitudinal cleavage strength, is more preferably 2.0% or less, and is still more preferably 1.0% or less. There is no particular lower limit value for the internal haze of the first piezoelectric material and the lower limit value may, for example, be set at 0.01%.

The internal haze of the first piezoelectric material is a value measured for a first piezoelectric material having a thickness of from 0.03 mm to 0.05 mm at 25° C. in accordance with JIS-K7105 by using a haze measuring machine (TC-HIII DPK, manufactured by Tokyo Denshoku Co., Ltd.).

An example of a method of measuring the internal haze of the first piezoelectric material will be described below.

First, a sample 1 consisting of a silicone oil (SHIN-ETSU SILICONE (trademark), product number: KF96-100CS, manufactured by Shin-Etsu Chemical Co., Ltd.) alone sandwiched between two glass sheets is prepared, and the haze (hereinafter referred to as "haze (H2)") of the sample 1 is measured in the thickness direction.

Then, a sample 2 is prepared by arranging plural strands of the first piezoelectric material uniformly coated on the surface with a silicone oil next to each other without any gaps therebetween, sandwiched between two glass sheets, and the haze (hereinafter referred to as "haze (H3)") of the sample 2 is measured in the thickness direction.

The internal haze (H1) of the first piezoelectric material is then obtained by finding the difference between the hazes as described in the following Formula.

Internal haze($H11$)=haze($H3$)−haze($H2$)

The haze (H2) and the haze (H3) are each measured here using the following apparatus under the following measurement conditions.

Measurement apparatus: HAZE METER TC-HIIIDPK, manufactured by Tokyo Denshoku Co., Ltd.
Sample size: 30 mm in width×30 mm in length
Measurement conditions: based on JIS-K7105
Measurement temperature: room temperature (25° C.)
(Shape and Dimensions of First Piezoelectric Material)

The piezoelectric substrate of the present embodiment includes the elongate first piezoelectric material.

The elongate first piezoelectric material is preferably a piezoelectric material having a fiber shape (yarn-form) configured from a single or plural bundles, or a piezoelectric material having an elongate flat plate shape.

The piezoelectric material having a fiber shape (hereinafter also referred to as "fibrous piezoelectric material") and the piezoelectric material having an elongate flat plate shape (hereinafter also referred to as "elongate-flat-plate-shaped piezoelectric material") will be described in sequence below.

—Fibrous Piezoelectric Material—

Examples of the fibrous piezoelectric material include monofilament yarn and multifilament yarn.

Monofilament Yarn

The monofilament yarn preferably has a single yarn fineness of from 3 dtex to 30 dtex, and more preferably from 5 dtex to 20 dtex.

Handling the yarn is difficult in textile preparation processes and weaving processes when the single yarn fineness is less than 3 dtex. However, fusion between yarns readily occurs when the single yarn fineness is more than 30 dtex.

Cost considerations mean that monofilament yarn is preferably obtained by direct spinning and stretching. The monofilament yarn may be a procured yarn.

Multifilament Yarn

The overall fineness of multifilament yarn is preferably from 30 dtex to 600 dtex, and more preferably from 100 dtex to 400 dtex.

For example, both one-step yarns such as a spin-draw yarn, and also two-step yarns obtained by stretching such as those UDY (undrawn yarn), POY (high orientation undrawn yarn), or the like, are employable as the multifilament yarn. The multifilament yarn may be a procured yarn.

ECODEAR® PLA manufactured by Toray Industries, Inc., TERRAMAC® manufactured by Unitika Ltd., and PLASTARCH® manufactured by KURARAY CO., LTD. are employable as commercially available products of polylactic acid-based monofilament yarn and polylactic acid-based multifilament yarn.

The method of producing the fibrous piezoelectric material is not particularly limited, and any known method may be employed for production.

For example, a filament yarn (monofilament yarn or multifilament yarn) may be obtained as the first piezoelectric material by melt-spinning raw material (for example, polylactic acid) and then stretching the material (i.e. a melt-spinning stretching method). After spinning, the ambient temperature of the vicinity of the yarn is preferably maintained in a certain temperature range until cooling and solidification has occurred.

A filament yarn may be obtained as the first piezoelectric material by, for example, further separating fibers from a filament yarn obtained by the melt-spinning stretching method described above.

Cross-Sectional Profile

Various cross-sectional profiles may be employed as the cross-sectional profile of the fibrous piezoelectric material, such as a circular profile, an elliptical profile, a rectangular profile, a cocoon profile, a ribbon profile, a four-leafed profile, a star profile, and an irregular profile for cross-sections perpendicular to the longitudinal direction of the fibrous piezoelectric material.

—Elongate-Flat-Plate-Shaped Piezoelectric Material—

Examples of the elongate-flat-plate-shaped piezoelectric material include an elongate-flat-plate-shaped piezoelectric material (for example, a slit ribbon) obtained by slitting a piezoelectric film produced by a known method or a procured piezoelectric film.

Use of the elongate-flat-plate-shaped piezoelectric material as the first piezoelectric material enables close face-contact to be achieved with the conductor, thereby enabling charge generated by a piezoelectric effect to be efficiently detected as a voltage signal.

The elongate-flat-plate-shaped piezoelectric material (first piezoelectric material) in the present embodiment preferably includes a functional layer arranged on at least one principal face of the first piezoelectric material.

The functional layer may have a single-layer structure or may be a structure configured from two or more layers.

For example, in cases in which there are functional layers arranged on both principal faces of the elongate-flat-plate-shaped piezoelectric material, a functional layer arranged on the principal face on one side (hereinafter referred to as the "front face" for convenience) and a functional layer arranged on the face on the other side (hereinafter referred to as "back face" for convenience) may, independently, each have a single-layer structure or a structure configured from two or more layers.

There are various examples of functional layers that may be employed as the functional layer.

Examples of the functional layer include an adhesion-facilitation layer, a hard coat layer, a refractive index adjustment layer, an antireflection layer, an antiglare layer, a sliding-facilitation layer, an anti-blocking layer, a protective layer, an adhesive layer, an antistatic layer, a heat dissipation layer, an ultraviolet absorbing layer, an anti-Newton ring layer, a light scattering layer, a polarizing layer, a gas barrier layer, a hue adjustment layer, and an electrode layer.

The functional layer may be a layer including two or more layers from out of such layers.

The functional layer may be a layer having two or more of such functions.

In cases in which the functional layers are disposed on both principal faces of the elongate-flat-plate-shaped piezoelectric material, the functional layer arranged on the front face side and the functional layer arranged on the back face side may be the same type of functional layer or different types of functional layer.

Examples of the effects of the functional layer include the effect of filling defects such as die lines and dents in the surface of the elongate-flat-plate-shaped piezoelectric material so as to improve the appearance thereof. In such cases, the smaller the difference between the refractive indices of the elongate-flat-plate-shaped piezoelectric material and the functional layer, the more that reflection is reduced at the interface between the elongate-flat-plate-shaped piezoelectric material and the functional layer, and the greater the improvement in appearance.

The functional layer preferably includes at least one of an adhesion-facilitation layer, a hard coat layer, an antistatic layer, an anti-blocking layer, a protective layer, or an electrode layer. Adopting such an approach further facilitates application to, for example, a piezoelectric device (such as a piezoelectric textile or a piezoelectric fabric), a force sensor, an actuator, or a biodata acquisition device.

The functional layer more preferably includes an electrode layer.

The electrode layer may be provided so as to be in contact with the elongate-flat-plate-shaped piezoelectric material, or may be disposed with a functional layer other than the electrode layer interposed therebetween.

A particularly preferred aspect of the elongate-flat-plate-shaped piezoelectric material (first piezoelectric material) in the present embodiment is an aspect including functional layers provided on both principal faces of the elongate-flat-plate-shaped piezoelectric material, with both of the functional layers including an electrode layer.

In the elongate-flat-plate-shaped piezoelectric material (first piezoelectric material) in the present embodiment, at least one surface layer of a layered body including the first piezoelectric material and the functional layer is preferably an electrode layer. In other words, in the elongate-flat-plate-shaped piezoelectric material (first piezoelectric material) in the present embodiment, preferably at least one out of the surface layer on the front face side or the surface layer of the back face side is an electrode layer (i.e., the electrode layer is preferably exposed).

This thereby enables the conductor (preferably an inner conductor) or the first outer conductor to be more easily connected to the layered body in cases in which the elongate-flat-plate-shaped piezoelectric material is used as one of the configuration elements of, for example, a piezoelectric device (such as a piezoelectric textile or a piezoelectric fabric), a force sensor, an actuator, or a biodata acquisition device. This raises the ease of manufacturing the piezoelectric device (such as a piezoelectric textile or a piezoelectric fabric), the force sensor, the actuator, or the biodata acquisition device.

There is no particular limitation to the material of the functional layer, and examples thereof include: an inorganic substance such as a metal or a metal oxide; an organic substance such as a resin; a composite composition including a resin and fine particles; and the like. Examples of substances that may be employed as such a resin include a cured resin obtained by curing using heat or actinic-radiation energy. In other words, a curable resin may be used as the resin.

Examples of the curable resin include at least one material (curable resin) selected from the group consisting of an acrylic-based compound, a methacrylic-based compound, a vinyl-based compound, an allyl-based compound, a urethane-based compound, an epoxy-based compound, an epoxide-based compound, a glycidyl-based compound, an oxetane-based compound, a melamine-based compound, a cellulose-based compound, an ester-based compound, a silane-based compound, a silicone-based compound, a siloxane-based compound, a silica-acryl hybrid compound, and a silica-epoxy hybrid compound.

Among these, an acrylic-based compound, an epoxy-based compound, and a silane-based compound are more preferred.

Examples of the metal include at least one selected from Al, Si, Ti, V, Cr, Fe, Co, Ni, Cu, Zn, In, Sn, W, Ag, Au, Pd, Pt, Sb, Ta, or Zr, or an alloy thereof.

Examples of the metal oxide include titanium oxide, zirconium oxide, zinc oxide, niobium oxide, antimony oxide, tin oxide, indium oxide, cerium oxide, aluminum oxide, silicon oxide, magnesium oxide, yttrium oxide, ytterbium oxide, tantalum oxide, and at least one composite oxide thereof.

Examples of the fine particles include: fine particles of metal oxides such as those described above; resin fine particles such as fine particles of a fluorine-based resin, a silicone-based resin, a styrenic-based resin, an acrylic-based resin, and the like. Examples also include hollow fine particles configured with internal pores in such fine particles.

From the viewpoint of transparency, the average primary particle diameter of the fine particles is preferably from 1 nm to 500 nm, more preferably from 5 nm to 300 nm, and still more preferably from 10 nm to 200 nm. An average primary particle diameter of 500 nm or less results in suppression of visible light scattering, while an average primary particle diameter of 1 nm or more results in suppression of the secondary aggregation of the fine particles, this being desirable to achieve from the viewpoint of maintaining transparency.

The film thickness of the functional layer is not particularly limited, and is preferably in a range of from 0.01 μm to 10 μm.

The above upper limit value to the thickness is more preferably 6 μm or less, and still more preferably 3 μm or less. The lower limit value thereof is more preferably 0.01 μm or more, and still more preferably 0.02 μm or more.

The above thickness represents the thickness of the entire multilayer film in cases in which the functional layer is a multilayer film configured from plural functional layers. There may be a functional layer on each face of the elongate-flat-plate-shaped piezoelectric material. The refractive indices of the functional layers may be values different from each other.

There are no particular limitations to the method of producing the elongate-flat-plate-shaped piezoelectric material, and the elongate-flat-plate-shaped piezoelectric material may be produced by a known method.

For example, a method to produce a first piezoelectric material from a piezoelectric film is to mold raw material (for example, polylactic acid) into a film-form to obtain an unstretched film, to stretch and crystallize the obtained unstretched film, and then to slit the obtained piezoelectric film.

"Slitting" here means cutting the piezoelectric film is cut into an elongated shape.

Either the stretching or the crystallization may be performed first. A method may also be adopted in which the unstretched film is sequentially subjected to preliminary crystallization, then stretching, and then crystallization (annealing). Such stretching may be monoaxial stretching or biaxial stretching. In cases in which biaxial stretching is performed, a higher stretching ratio is preferably set in one direction (the principal stretching direction).

The method for producing the piezoelectric film may be performed with appropriate reference to known literature such as Japanese Patent No. 4934235, WO 2010/104196, WO 2013/054918, and WO 2013/089148.

<Second Piezoelectric Material>

The piezoelectric substrate of the first embodiment may include an elongate second piezoelectric material.

The second piezoelectric material preferably has characteristics similar to those of the first piezoelectric material.

In other words, the second piezoelectric material preferably includes an optically active helical chiral polymer (A), a lengthwise direction of the second piezoelectric material and a principal orientation direction of the helical chiral polymer (A) included in the second piezoelectric material are substantially parallel to each other, and a degree of orientation F of the second piezoelectric material, determined from X-ray diffraction measurement by the above Formula (a), is in a range of from 0.5 up to but not including 1.0.

The second piezoelectric material also preferably has characteristics similar to those of the first piezoelectric material for characteristics other than the above.

However, the winding directions of the first piezoelectric material and the second piezoelectric material, and the chiralities of the helical chiral polymers (A) included in the first piezoelectric material and the second piezoelectric material may be appropriately selected according to the aspect of the piezoelectric substrate from the viewpoint of better exhibiting the effects of the present embodiment.

Examples of preferred combinations of the winding directions of the first piezoelectric material and the second piezoelectric material and the chiralities of the helical chiral polymers (A) included in the first piezoelectric material and the second piezoelectric material are as described above in the specific aspects.

The second piezoelectric material may have characteristics different from those of the first piezoelectric material.

<First Insulator>

The piezoelectric substrate of the first embodiment may further include a first insulator.

The first insulator is preferably helically wound around the outer peripheral surface of the inner conductor.

In such cases, the first insulator may be arranged at the opposite side from the inner conductor as viewed from the first piezoelectric material, or may be interposed between the inner conductor and the first piezoelectric material.

The winding direction of the first insulator may be the same direction as the winding direction of the first piezoelectric material or a different direction therefrom.

This is advantages particularly in cases in which the piezoelectric substrate of the first embodiment includes a first outer conductor, since further including the first insulator in the piezoelectric substrate according to the first embodiment makes it easier to suppress the occurrence of an electrical short circuit between the inner conductor and the outer conductor when the piezoelectric substrate undergoes bending deformation.

The first insulator is not particularly limited, and examples thereof include a vinyl chloride resin, a polyethylene resin, a polypropylene resin, an ethylene-tetrafluoroethylene copolymer (ETFE), a tetrafluoroethylene-hexafluoropropylene copolymer (FEP), a tetrafluoroethylene resin (PTFE), a tetrafluoroethylene-perfluoropropylvinylether copolymer (PFA), a fluororubber, a polyester resin, a polyimide resin, a polyamide resin, a polyethylene terephthalate resin (PET), and a rubber (including an elastomer).

The shape of the first insulator is preferably an elongate shape from the viewpoint of winding around the conductor.

<Second Insulator>

The piezoelectric substrate of the present embodiment may, in cases in which a first outer conductor is provided at an outer periphery thereof, further include a second insulator provided at the outer periphery of the first outer conductor.

Adopting such an approach enables the inner conductor configuring the signal line to be electrostatically shielded when functioning as a piezoelectric sensor, and suppresses voltage fluctuations in the conductor (preferably an inner conductor) due to the effects of external static electricity.

The second insulator is not particularly limited, and examples thereof include the materials described in the examples of the first insulator.

The shape of the second insulator is not particularly limited, and any shape capable of covering at least a portion of the first outer conductor may be adopted therefor.

(First Outer Conductor)

The piezoelectric substrate of the present embodiment preferably further includes a first outer conductor at an outer periphery.

The first outer conductor in the present embodiment is preferably a ground conductor, when functioning as a piezoelectric sensor.

The ground conductor refers to, for example, a conductor paired with the conductor (preferably a signal line conductor) when a signal is being detected.

The material of the ground conductor is not particularly limited, and main examples thereof include the following materials according to the cross-sectional profile thereof.

For example, materials that may be used as the material of a ground conductor having a rectangular cross-section include a copper foil ribbon obtained by rolling a copper wire of a circular cross-section so as to process the copper wire into a flat plate shape, an Al foil ribbon, and the like.

For example, materials that may be used as the material of a ground conductor having a circular cross-section include a copper wire, an aluminum wire, an SUS wire, a metal wire covered with an insulating layer, a carbon fiber, a resin fiber integrated together with a carbon fiber, and a tinsel wire obtained by spirally winding a copper foil around a fiber.

A material obtained by coating an organic conductive material with an insulating material may be used as the material of the ground conductor.

The ground conductor is preferably arranged to wrap around the conductor (preferably a signal line conductor) and the first piezoelectric material so as to avoid short circuiting with the signal line conductor.

A method of wrapping such a signal line conductor may be a wrapping method selected from a method of helically winding a copper foil or the like, a method of making a copper wire or the like into a cylindrical braid and then wrapping such a signal line conductor therein, or the like.

The method of wrapping the signal line conductor is not limited to these methods. Wrapping the signal line conductor enables electrostatic shielding to be performed, and enables voltage fluctuations in the signal line conductor due to the effects of external static electricity to be prevented.

A preferable aspect is also an arrangement of the ground conductor so as to be arranged by wrapping in a cylindrical shape so as to enclose a minimum basic configuration unit (i.e., the conductor and the first piezoelectric material) of the piezoelectric substrate of the present embodiment.

Various cross-sectional profiles may be employed as the cross-sectional profile of the ground conductor, such as a circular profile, an elliptical profile, a rectangular profile, and an irregular profile. In particular, a rectangular cross-section enables close contact to be achieved by flat-faces with the conductor (preferably a signal line conductor), the first piezoelectric material, and, according to circumstances, with the first insulator, the second piezoelectric material, or the like, thereby enabling charge generated by a piezoelectric effect to be efficiently detected as a voltage signal.

<Adhesive Agent to Form Adhesive Layer>

The piezoelectric substrate of the present embodiment preferably includes an adhesive layer between the conductor and the first piezoelectric material.

The adhesive agent to form the adhesive layer is used in order to mechanically integrate the conductor and the first piezoelectric material together or to maintain an inter-electrode distance (between the conductor and the outer conductor) in cases in which the piezoelectric substrate includes an outer conductor.

Providing the adhesive layer between the conductor and the first piezoelectric material inhibits the relative position of the conductor and the first piezoelectric material from shifting when tension has been applied to the piezoelectric substrate of the present embodiment, thereby facilitating application of tension to the first piezoelectric material. This accordingly enables a voltage output proportional to the tension to be effectively detected from the conductor (preferably a signal line conductor). As a result, piezoelectric sensitivity and piezoelectric output stability are further improved. Providing the adhesive layer results in a further increase in the absolute value of the amount of generated charge per unit tensile force.

However, since suppleness is maintained after processing a piezoelectric substrate lacking an adhesive layer between a conductor and a first piezoelectric material into a piezoelectric fiber, this approach results in a favorable feeling of fit when employed in a wearable sensor or the like.

The following materials may be used as the material of the adhesive agent to form the adhesive layer.

Examples of adhesive agents that may be used therefor include an epoxy-based adhesive agent, a urethane-based adhesive agent, a vinyl acetate resin-based emulsion type adhesive agent, an (EVA)-based emulsion type adhesive agent, an acrylic resin-based emulsion type adhesive agent, a styrene-butadiene rubber-based latex type adhesive agent, a silicone resin-based adhesive agent, an α-olefin (isobutene-maleic anhydride resin)-based adhesive agent, a vinyl chloride resin-based solvent type adhesive agent, a rubber-based adhesive agent, an elastic adhesive agent, a chloroprene rubber-based solvent type adhesive agent, a nitrile rubber-based solvent type adhesive agent or the like, and a cyanoacrylate-based adhesive agent or the like.

—Elastic Modulus—

The adhesive agent in the present embodiment preferably has an elastic modulus after bonding that is either equivalent to, or greater than, that of the first piezoelectric material. If the material used has an elastic modulus lower than the elastic modulus of the first piezoelectric material, then strain (piezoelectric strain) caused by tension that has been applied to the piezoelectric substrate of the present embodiment would be attenuated by the adhesive agent portion, decreasing the transfer efficiency of strain to the first piezoelectric material. This results in the sensitivity of a sensor being prone to decrease in cases in which the piezoelectric substrate of the present embodiment is applied to a sensor, for example.

—Thickness—

The thickness at sites bonded by the adhesive agent in the present embodiment is preferably as thin as possible within a range in which there are no voids between the bonding targets and bonding strength does not decrease. Decreasing the thickness at the bonded sites makes it less likely that strain caused by tension that has been applied to the piezoelectric substrate is attenuated by the adhesive agent portion, and the strain on the first piezoelectric material is efficiently decreased. This results in the sensitivity of a sensor being improved in cases in which the piezoelectric substrate of the present embodiment is applied to a sensor, for example.

—Method of Applying Adhesive Agent—

The method of applying the adhesive agent is not particularly limited, and the following two methods are primarily used therefor.

Method of Interposing Adhesive Agent and Performing Bonding after Processing

Examples thereof include a method in which: a conductor (preferably a signal line conductor) and a first piezoelectric material are arranged; the signal line conductor and a ground conductor are processed and arranged; and then, after this has been completed, an adhesive agent is interposed and adhered at an interface between the conductor and the first piezoelectric material by a method such as dip coating, impregnation, or the like.

In the above method, as well as bonding the conductor and the first piezoelectric material to each other, bonding may also be performed between each member that has, if necessary, been included in the piezoelectric substrate of the present embodiment.

Method of Interposing Uncured Adhesive Agent Before Processing, and Performing Bonding after Processing Examples thereof include a method in which a photo-curable adhesive agent, a thermosetting adhesive agent, a thermoplastic adhesive agent, or the like is coated in advance onto a surface of a first piezoelectric material using a gravure coater, a dip coater, or the like, and then dried. Then after completing arrangement of a conductor and the first piezoelectric material, the adhesive agent is then cured by ultraviolet irradiation or heat so as to bond an interface between the conductor and the first piezoelectric material.

In the above method, as well as bonding the conductor and the first piezoelectric material to each other, bonding may also be performed between each member that has, if necessary, been included in the piezoelectric substrate of the present embodiment.

Using the above method enables processing to be performed by dry processes, after the adhesive agent has been coated and dried, thereby facilitating processing or facilitating formation of a uniform film thickness. This results in characteristically small variations in sensor sensitivity and the like.

<Method of Producing Piezoelectric Substrate>

The method of producing the piezoelectric substrate of the present embodiment is not particularly limited, and the piezoelectric substrate may be produced, for example, by preparing a first piezoelectric material and helically winding the first piezoelectric material around a separately prepared conductor (preferably a signal line conductor) in one direction.

The first piezoelectric material may also be produced by a known method and may also be procured.

In cases in which the piezoelectric substrate of the present embodiment includes, if necessary, a second piezoelectric material and a first insulator, such a piezoelectric substrate may be produced in accordance with the methods for helically winding the first piezoelectric material.

However, the directions of winding the first piezoelectric material and the second piezoelectric material, and the chiralities of the helical chiral polymers (A) included in the first piezoelectric material and the second piezoelectric material, are preferably selected in accordance with the aspects of the piezoelectric substrate described above.

In cases in which the piezoelectric substrate of the present embodiment includes a first outer conductor (for example, a ground conductor), such a piezoelectric substrate may be produced by arranging the first outer conductor using the above methods or a known method.

If necessary, the conductor and the first piezoelectric material, and each member included in the piezoelectric substrate of the present embodiment, may be stuck together by interposing an adhesive agent therebetween using, for example, the method described above.

Moreover, when the piezoelectric substrate of the present embodiment includes a first outer conductor (for example a ground conductor), such a piezoelectric substrate can be manufactured by arranging the first outer conductor by the method described above or by a known method.

Note that an adhesive may be employed between the conductor and the first piezoelectric material, and, as required, between each of the members included in the piezoelectric substrate of the present embodiment, so as to stick these together using the method described above, for example.

When the piezoelectric substrate of the present embodiment is applied with a tensile force, shear strain proportional to the tensile force is induced therein, and positive charge is generated at the conductor (inner conductor 16A) side when the tensile force is applied to the helical chiral (A). When the piezoelectric substrate is applied with a compressional force, shear strain proportional to the compressional force is induced therein, and negative charge is generated at the conductor (inner conductor 16A) side when the compressional force is applied to the helical chiral (A). This means that in the piezoelectric substrate, a positive or negative charge signal in accordance with the force applied is detectable from the conductor (the inner conductor 16A).

Summary of First Embodiment

A feature of the first embodiment is the provision on the holding member 20 formed of an elastic body of the pressure bearing face 22 to bear pressure, and installation of the piezoelectric substrate 12 capable of detecting tensile force on the adjoining face 24 that undergoes deformation in accordance with the pressure borne by the pressure bearing face 22. For example, in the flat plate-shaped holding member 20, when pressure from contact by an object or the like (including pressure arising from shock or vibration) is applied to the pressure bearing face 22, tensile force acts on the piezoelectric substrate 12 due to bulging deformation of the adjoining face 24. When the piezoelectric substrate 12 bears the tensile force, the piezoelectric substrate 12 outputs a signal in accordance with the tensile force. Moreover, when the pressure bearing face 22 is applied with pressure (including pressure arising from shock or vibration) in the opposite direction to the pressure bearing direction due to the pressure bearing face 22 being pulled away from the installation face 26, then a compressional force acts on the piezoelectric substrate 12 due to compressional deformation of the adjoining face 24. When the piezoelectric substrate 12 bears the compressional force, the piezoelectric substrate 12 outputs a signal in accordance with the compressional force.

Figure 16A:
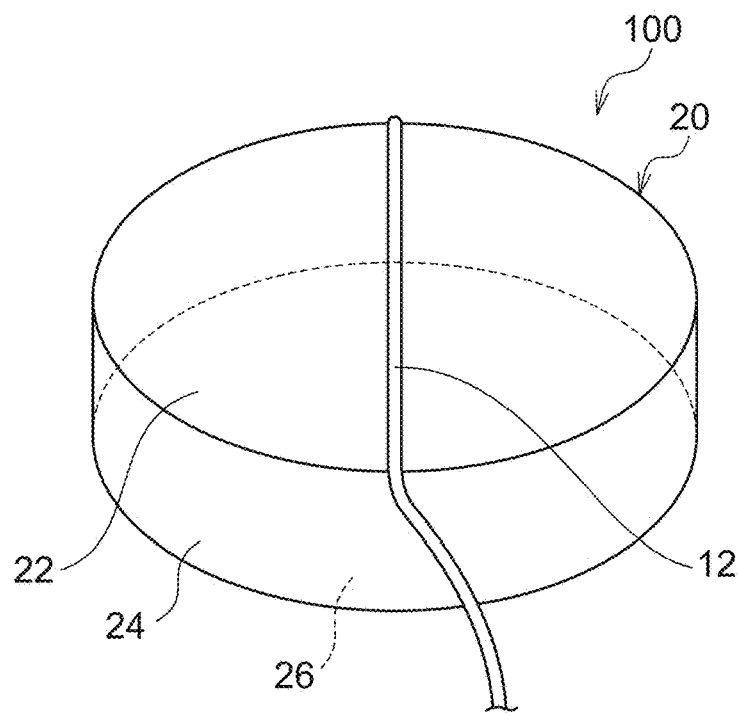
FIG. 16A is a perspective view of a sensor module of a Comparative Example 1.

The advantageous effects of the present embodiment will now be explained by comparison to a comparative example with a modified arrangement of the piezoelectric substrate 12. FIG. 16A illustrates an example (Comparative Example 1) in which a piezoelectric substrate 12 is installed and fixed to the front surface of a pressure bearing face 22 of an elastic body holding member 20. In Comparative Example 1, pressure is generated on the piezoelectric substrate 12 by an object or the like contacting the pressure bearing face 22. However, when the piezoelectric substrate 12 is pressed from above, the holding member 20 suffers from a loss of cushioning properties as an elastic body due to the presence of the piezoelectric substrate 12. Moreover, a mechanical load is large due to direct action of load on the piezoelectric substrate 12. This accordingly gives rise to concern regarding damage such as line breakage when contacted by a pointed object or the like.

Figure 16B:
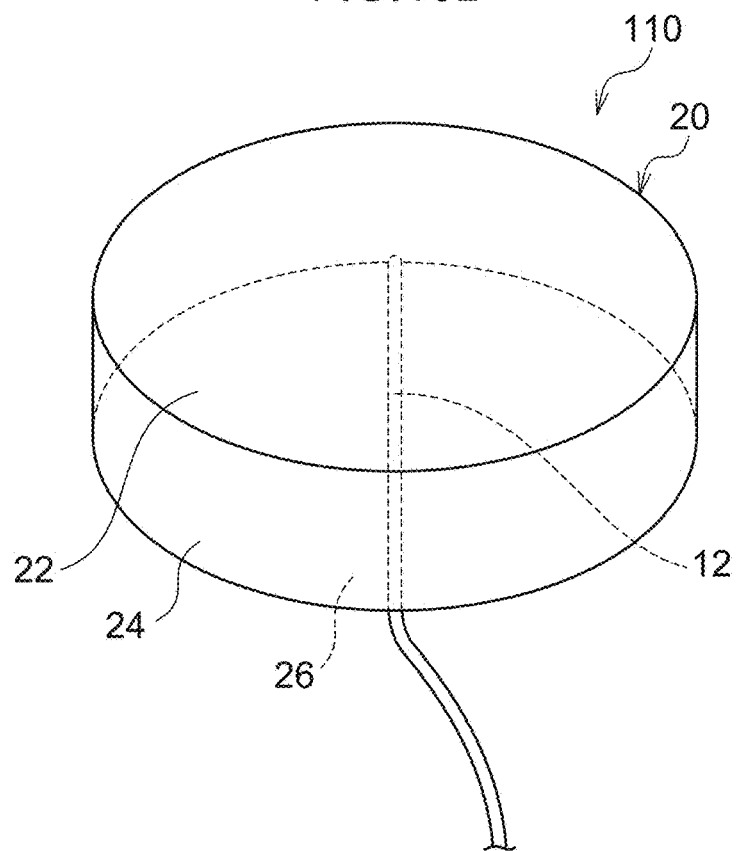
FIG. 16B is a perspective view of a sensor module of a Comparative Example 2.

FIG. 16B illustrates an example (Comparative Example 2) in which a piezoelectric substrate 12 is installed and fixed to the back face of an elastic body holding member 20 relative to the pressure bearing face 22, namely on an installation face 26. The piezoelectric substrate 12 is always pressed through the holding member 20 in Comparative Example 2. Namely, there is a low probability of line breakage, due to pressure not being directly applied to the piezoelectric substrate 12, however, the voltage sensitivity is lower than in Comparative Example 1.

When a configuration is adopted in which the piezoelectric substrate is installed directly below the pressure bearing location, as in Comparative Examples 1 and 2, and technology hitherto (Patent Documents 3 and 4), sometimes voltage is not output, or the voltage sensitivity is low, when pressure is borne at a place some distance away from place where the piezoelectric substrate is installed.

In contrast thereto, the piezoelectric substrate 12 is wound in the present embodiment around the adjoining face 24 where significant deformation is induced by pressure borne by the pressure bearing face 22 on the upper side of the holding member 20. Namely, a structure is adopted in the present embodiment that utilizes the cushioning properties of the elastic body. In the present embodiment, a voltage is generated in the piezoelectric substrate 12 as long as the elastic body holding member 20 deforms, even when there is some misalignment between the pressure bearing location on the pressure bearing face 22 and the pressure bearing direction. Thus when detecting pressure, the sensor module 10 of the present embodiment enables a detection range to be secured and detection sensitivity to be raised while having a simple structure including a piezoelectric substrate. Moreover, in the present embodiment the mechanical burden on the piezoelectric substrate 12 is reduced due to the piezoelectric substrate 12 being deformed through the elastic body.

Second Embodiment

Figure 5:
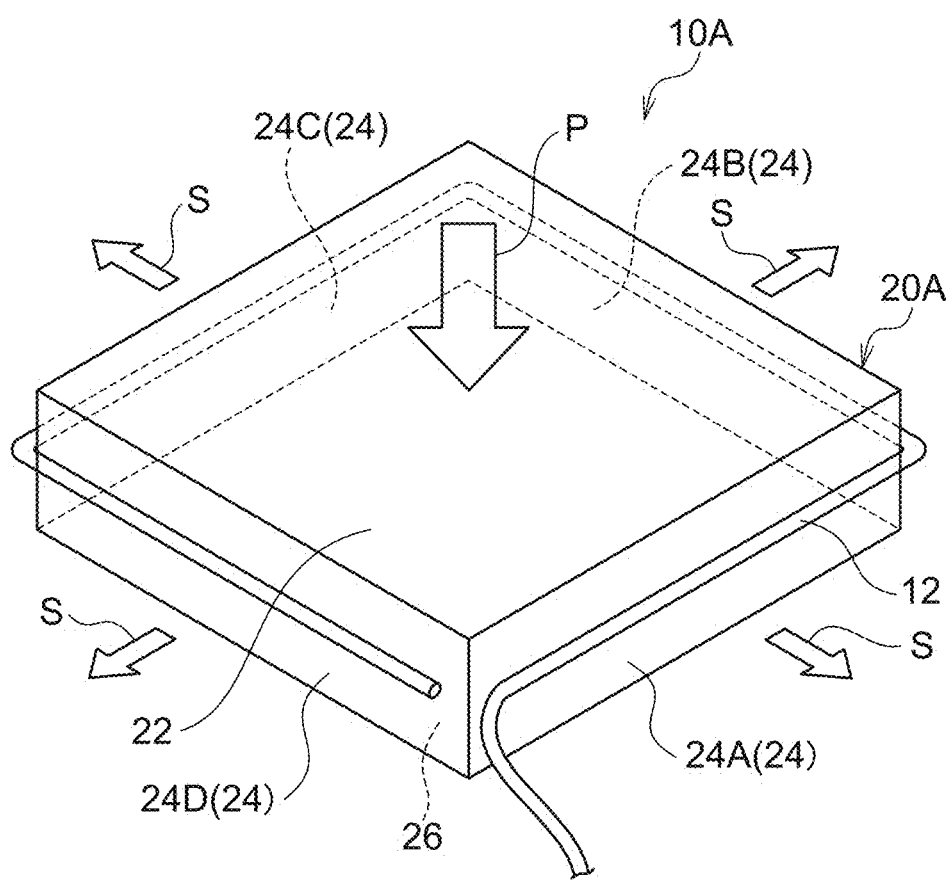
FIG. 5 is a perspective view of a sensor module of a second embodiment.

Explanation follows regarding a sensor module 10A of a second embodiment, with reference to FIG. 5.

The second embodiment differs from the first embodiment in the shape of the holding member. The structure of the piezoelectric substrate 12 is the same as that in the first embodiment, and so duplicate explanation thereof will be omitted. The same reference numerals are appended to configuration the same as that of the first embodiment.

As illustrated in FIG. 5, the sensor module 10A according to the present embodiment is configured including a holding member 20A formed of a cuboid elastic body, and an elongate piezoelectric substrate 12. The same material is selected for the holding member 20A of the present embodiment as that of the holding member 20 of the first embodiment. With regard to the hardness thereof, the indentation per unit load is preferably in a range of from 0.03 mm to 0.5 mm when a cylindrical metal bar of 10 mm diameter is pushed into the pressure bearing face 22.

In the holding member 20A of the present embodiment, due to being cuboidal, there are four adjoining faces 24 for the side faces adjoining the pressure bearing face 22 and the installation face 26. Namely, a first adjoining face 24A, a second adjoining face 24B, a third adjoining face 24C, and a fourth adjoining face 24D are formed in sequence around the pressure bearing direction (indicated by arrow P in FIG. 5).

A cable shaped piezoelectric substrate 12 is arranged on the adjoining faces 24. Specifically, the piezoelectric substrate 12 is arranged from the first adjoining face 24A to the fourth adjoining face 24D. Namely, the piezoelectric substrate 12 is fixed by adhering to the adjoining faces 24 in a state wound around the adjoining faces 24. In other words, the piezoelectric substrate 12 is provided on the adjoining faces 24 around the pressure bearing direction (indicated by arrow P in FIG. 5) so as to surround the holding member 20A.

The sensor module 10A of the present embodiment has operation similar to that of the first embodiment. Namely, the adjoining faces 24 undergo bulging deformation toward the outside (indicated by arrows S in FIG. 5) of the holding member 20A as a result of compression occurring between the pressure bearing face 22 and the installation face 26 when pressure from the pressure bearing direction (indicated by arrow P in FIG. 5) is borne by the pressure bearing face 22 of the holding member 20A. Tensile force is generated in the piezoelectric substrate 12 provided on the adjoining faces 24 by the bulging deformation of the adjoining faces 24, generating a voltage. Moreover, a compressional force is generated in the piezoelectric substrate 12 provided on the adjoining faces 24 by the compressional deformation of the adjoining face 24 when the pressure bearing face 22 is pulled away from the installation face 26, generating a voltage in the opposite direction to when a tensile force is imparted to the piezoelectric substrate 12. Similar advantageous effects are exhibited thereby to those of the first embodiment.

Third Embodiment

Figure 6:
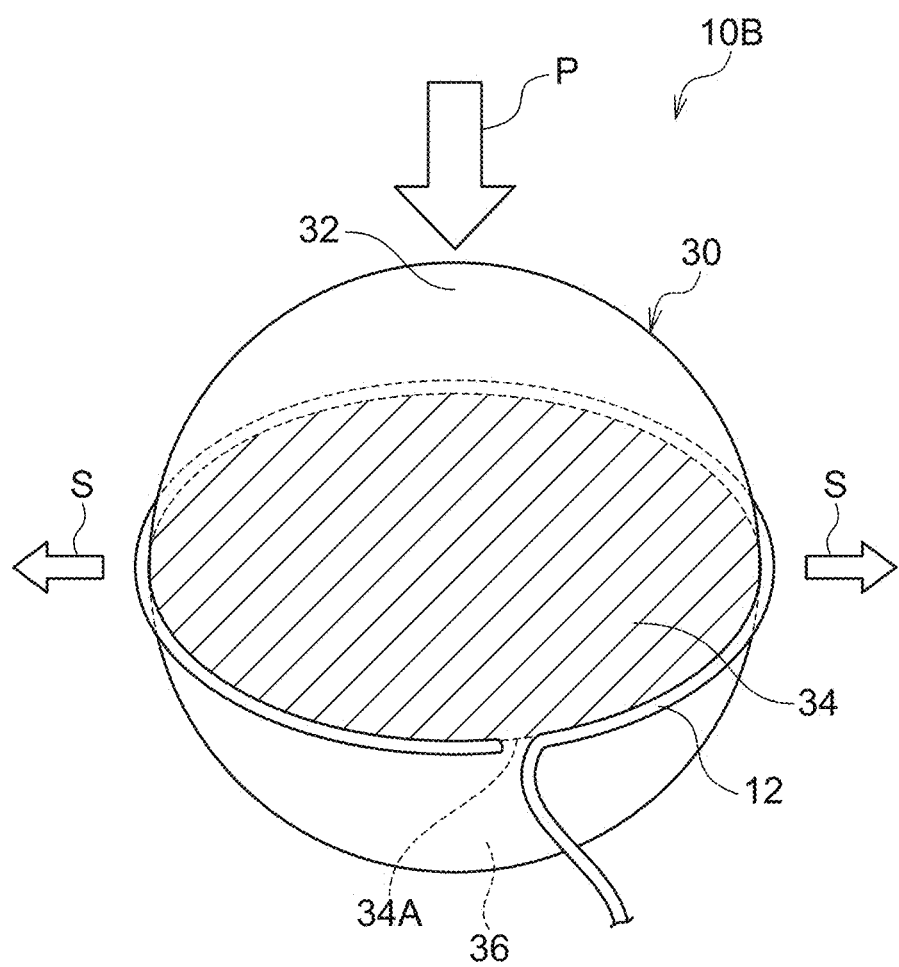
FIG. 6 is a perspective view of a sensor module of a third embodiment.

Explanation follows regarding a sensor module 10B of a third embodiment, with reference to FIG. 6.

The third embodiment differs from the first and second embodiments in the shape of the holding member. Note that the structure of the piezoelectric substrate 12 is the same as that in the first and second embodiments, and so duplicate explanation thereof will be omitted. Moreover, the same reference numerals are appended to configuration the same as that of the first and second embodiments.

As illustrated in FIG. 6, the sensor module 10B according to the present embodiment is configured including a holding member 30 formed of a spherical elastic body, and an elongate piezoelectric substrate 12.

When the holding member 30 is, for example, installed on a floor surface and pressure is borne from above, an upper end portion of the holding member 30 configures a pressure bearing portion 32 to bear the pressure, and a lower end portion thereof configures an installation portion 36, with a face perpendicular to a central line connecting the pressure bearing portion 32 and the installation portion 36 together configuring an intersecting plane 34. As described above, the holding member 30 is an elastic body, and deformation is induced in the intersecting plane 34 intersecting the pressure bearing direction when pressure is borne by the pressure bearing portion 32, with the deformation being induced in accordance with the pressure borne by the pressure bearing portion 32. Taking the outer edge portion of the intersecting plane 34 as an outer peripheral portion 34A, then the outer peripheral portion 34A also deforms together with deformation of the intersecting plane 34.

The material selected for the holding member 30 of the present embodiment is the same as that of the holding member 20 of the first embodiment. With regard to the hardness thereof, the indentation per unit load is preferably in a range of from 0.03 mm to 0.5 mm when the pressure bearing face 22 is pressed by a cylindrical metal bar of 10 mm diameter.

The piezoelectric substrate 12 formed in a cable shape is arranged around the outer peripheral portion 34A. More specifically, the piezoelectric substrate 12 is fixed by adhering along a circular shaped outer peripheral portion 34A in a state wound therearound. In other words, the piezoelectric substrate 12 is provided on the holding member 30 around the pressure bearing direction (indicated by arrow P in FIG. 6) so as to surround the holding member 30. Note that in the present embodiment the piezoelectric substrate 12 is fixed by adhering all of the portions in contact with the outer peripheral portion 34A.

The sensor module 10B of the present embodiment has operation similar to those of the first and second embodiments. Namely, as a result of compression generated between the pressure bearing portion 32 and the installation portion 36 when the pressure bearing portion 32 of the holding member 30 bears pressure from the pressure bearing direction (indicated by arrow P in FIG. 6), the holding member 30 deforms into a flattened shape by side portions thereof bulging toward the outside (indicated by arrows S in FIG. 6). The diameter of the intersecting plane 34 accordingly increases, namely, the peripheral length of the outer peripheral portion 34A is extended. A tensile force is generated in the piezoelectric substrate 12 provided on the outer peripheral portion 34A due to the extension of the outer peripheral portion 34A, generating a voltage. A compressional force is generated in the piezoelectric substrate 12 as a result of the peripheral length of the outer peripheral portion 34A shrinking in cases in which the pressure bearing portion 32 is pulled away from the installation portion 36, generating a voltage in the piezoelectric substrate 12 in the opposite direction to when a tensile force is imparted thereto.

Note that although in the present embodiment the pressure bearing portion 32 bearing pressure has been defined as being the upper end portion, the location bearing pressure (pressure bearing location) is not necessarily always the pressure bearing portion 32, and moreover the direction pressure is borne in (pressure bearing direction) is also not limited to a direction toward a central portion of the spherical holding member 30. Namely, as long as the diameter of the intersecting plane 34 increases when pressure is borne and the peripheral length of the outer peripheral portion 34A extends, there is no particular limitation to the pressure bearing location nor to the pressure bearing direction. Namely, the present embodiment is able to detect pressure as long as pressure is borne from above the intersecting plane 34.

A feature of the third embodiment is that the pressure bearing portion 32 bearing pressure is provided at the holding member 30 formed of an elastic body, and the piezoelectric substrate 12 capable of detecting tensile force is installed to the outer peripheral portion 34A of the intersecting plane 34 that deforms in accordance with pressure borne by the pressure bearing portion 32. For example, in the spherical holding member 30, tensile force acts on the piezoelectric substrate 12 due to the peripheral length of the outer peripheral portion 34A extending when pressure (including pressure arising from shock or vibration) is applied to the pressure bearing portion 32 by contact from an object or the like. When tensile force is borne by the piezoelectric substrate 12, the piezoelectric substrate 12 outputs a signal in accordance with the tensile force. Namely, the present embodiment adopts a structure utilizing cushioning properties of an elastic body.

In the present embodiment, similarly to in the first embodiment, the piezoelectric substrate 12 generates a voltage as long as the elastic body holding member 30 is deformed, even when there is some misalignment in the pressure bearing location on the pressure bearing portion 32 and the pressure bearing direction. Thus when detecting pressure, the sensor module 10B of the present embodiment enables a detection range to be secured and detection sensitivity to be raised while having a simple structure including a piezoelectric substrate. The piezoelectric substrate 12 is also deformed in the present embodiment through the elastic body, reducing the mechanical burden on the piezoelectric substrate 12.

Fourth Embodiment

Figure 7:
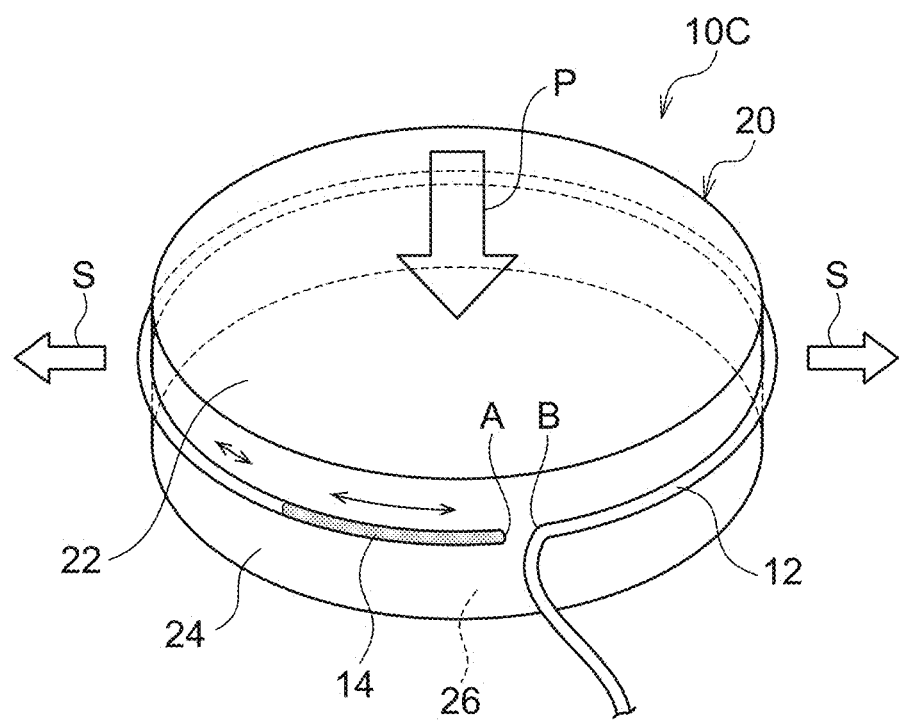
FIG. 7 is a perspective view of a sensor module of a fourth embodiment.

Explanation follows regarding a sensor module 10C of a fourth embodiment, with reference to FIG. 7.

The fourth embodiment differs from the first embodiment in the installation method of the piezoelectric substrate 12. Note that the structure of the piezoelectric substrate 12 is the same as that of the first embodiment and so duplicate explanation thereof will be omitted. The same reference numerals are appended to configuration the same as that of the first embodiment.

As illustrated in FIG. 7, a sensor module 10C according to the present embodiment has a rubber string 14 configured from a string shaped piece of elastic connected to a leading end of the piezoelectric substrate 12. In the present embodiment the rubber string 14 is wound together with the piezoelectric substrate 12 onto a cylindrical face of an adjoining face 24. However, in the present embodiment, all of the contact portions between the piezoelectric substrate 12 and the adjoining face 24, and all of the contact portions between the rubber string 14 and the adjoining face 24, are not fixed by adhering. Only a leading end portion A of the rubber string 14 connected to the piezoelectric substrate 12, and a rear end portion B of the piezoelectric substrate 12 contacting the adjoining face 24, are fixed by adhering.

The sensor module 10C of the present embodiment has operation similar to that of the first embodiment. Namely, the adjoining face 24 undergoes bulging deformation toward the outside of the holding member 20 (indicated by arrows S in FIG. 7) as a result of compression between the pressure bearing face 22 and the installation face 26 arising when pressure from the pressure bearing direction (indicated by arrow P in FIG. 7) is borne by the pressure bearing face 22 of the holding member 20. Tensional force is generated in the piezoelectric substrate 12 and the rubber string 14 provided on the adjoining face 24 by the bulging deformation of the adjoining face 24, generating a voltage in the piezoelectric substrate 12. Similar advantageous effects are exhibited to those of the first embodiment.

Limitations tend to arise in the compatible tensile force of a piezoelectric substrate 12, depending on the thickness of the inner conductor 16A and on the thickness of the first piezoelectric material 18A. There are accordingly sometimes cases in which line breakage might occur when the piezoelectric substrate 12 bears an excessive tensile force in cases in which the substance of the adjoining face 24 means that there is a large deformation thereof in response to pressure borne by the pressure bearing face 22. However, in the present embodiment, the elastically deformable rubber string 14 is connected to the piezoelectric substrate 12. This thereby enables line breakage of the piezoelectric substrate 12 to be suppressed by the rubber string 14 extending, even in cases in which excessive tensile force is applied to the piezoelectric substrate 12 by a large deformation of the adjoining face 24. A coil spring may be connected instead of the rubber string 14.

Fifth Embodiment

A sensor module 10D of a fifth embodiment will now be explained, with reference to FIG. 8A and FIG. 8B.

The fifth embodiment is based on the sensor module 10 of the first embodiment, with a protection member 28 formed of an elastic body provided at an outer peripheral portion of the holding member 20. More specifically, the adjoining face 24 and the piezoelectric substrate 12 arranged on the adjoining face 24 are covered by the protection member 28. Note that the structure is the same as that of the first embodiment, except for the protection member 28, and so duplicate explanation thereof will be omitted.

Figure 8A:
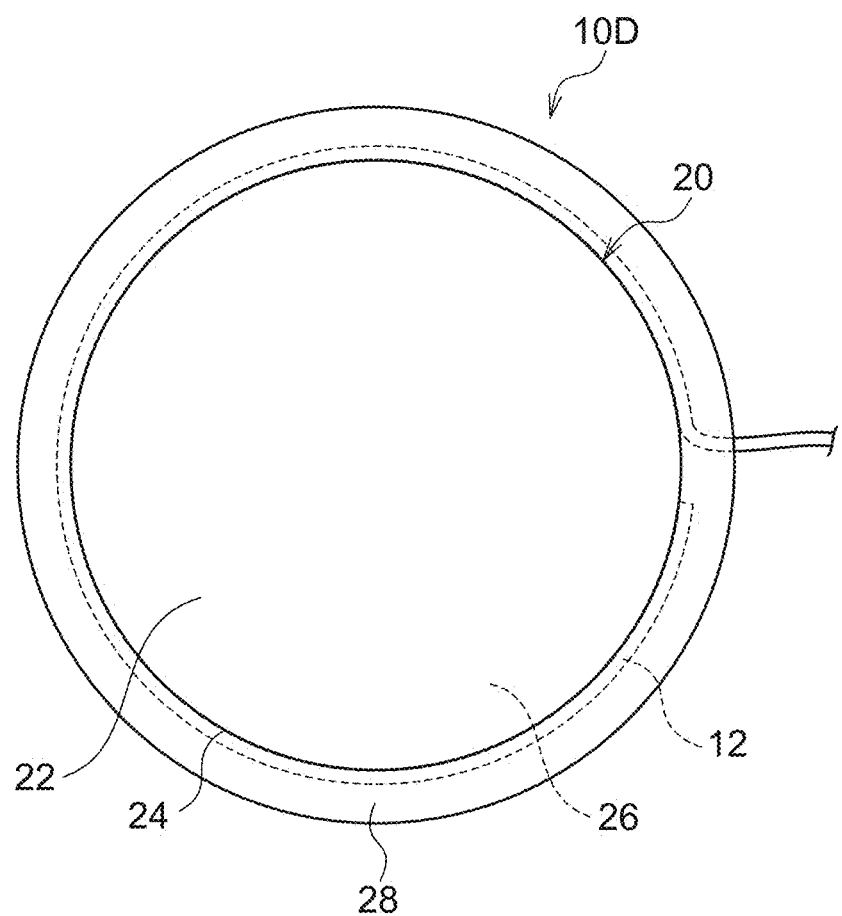
FIG. 8A is a plan view of a sensor module of a fifth embodiment.
Figure 8B:
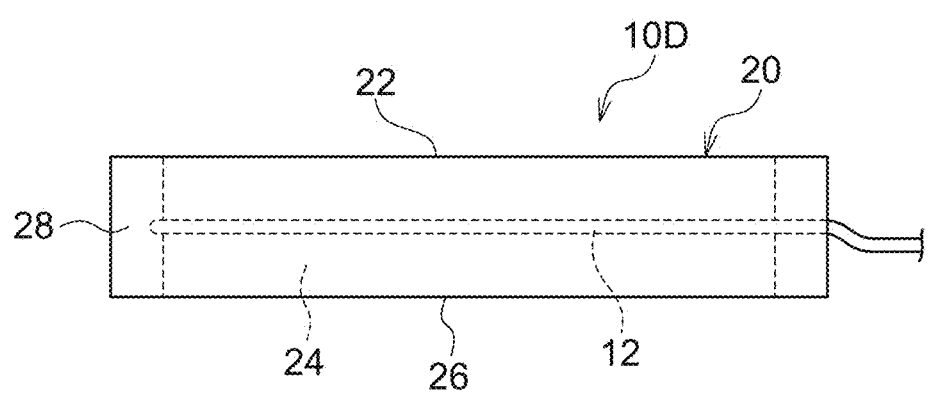
FIG. 8B is a side view of a sensor module of the fifth embodiment.

As illustrated in FIG. 8A, the protection member 28 of the present embodiment has cylindrical shape, and the inner diameter thereof is equivalent to the outer diameter of the holding member 20. Moreover, as illustrated in FIG. 8B, the height of the protection member 28 is also equivalent to the height of the holding member 20. Note that the height of the protection member 28 is not limited thereto, and there is no need to provide the protection member 28 so as to span from the installation face 26 to the pressure bearing face 22 as long as the piezoelectric substrate 12 is covered.

The sensor module 10D configured in the manner described above has operation similar to that of the sensor module 10 of the first embodiment. Namely, the adjoining face 24 undergoes bulging deformation as a result of compression between the pressure bearing face 22 and the installation face 26 occurring as a result of pressure borne by the pressure bearing face 22. Tensional force is generated in the piezoelectric substrate 12 provided on the adjoining face 24 by bulging deformation of the adjoining face 24, generating a voltage. Moreover, a compressional force is generated in the piezoelectric substrate 12 provided on the adjoining face 24 by the adjoining face 24 undergoing compressional deformation in cases in which the pressure bearing face 22 is pulled away from the installation face 26, generating a voltage in the piezoelectric substrate 12 in the opposite direction to when a tensile force is imparted thereto. Similar advantageous effects are exhibited thereby to those of the first embodiment.

The present embodiment exhibits the following operation and advantageous effects in addition to the operation and advantageous effects of the first embodiment. Namely, in the present embodiment, obstacles can be prevented from contacting the piezoelectric substrate 12 when the sensor module 10 is employed in an exposed state due to the piezoelectric substrate 12 being protected by the protection member 28. Moreover, providing the protection member 28 so as to function as a "hoop" on the cylindrical face of the holding member 20 suppresses deformation of the adjoining face 24 when excessive pressure is imparted to the pressure bearing face 22, and thereby enables line breakage in the piezoelectric substrate 12 to be suppressed.

The protection member 28 of the present embodiment is preferably formed from a softer material than the holding member 20 from the view point of not suppressing deformation of the adjoining face 24 excessively. Alternatively the protection member 28 may be formed from the same material as the holding member 20. In such cases the protection member 28 and the holding member 20 may be formed as an integrated body.

Sixth Embodiment

Figure 9A:
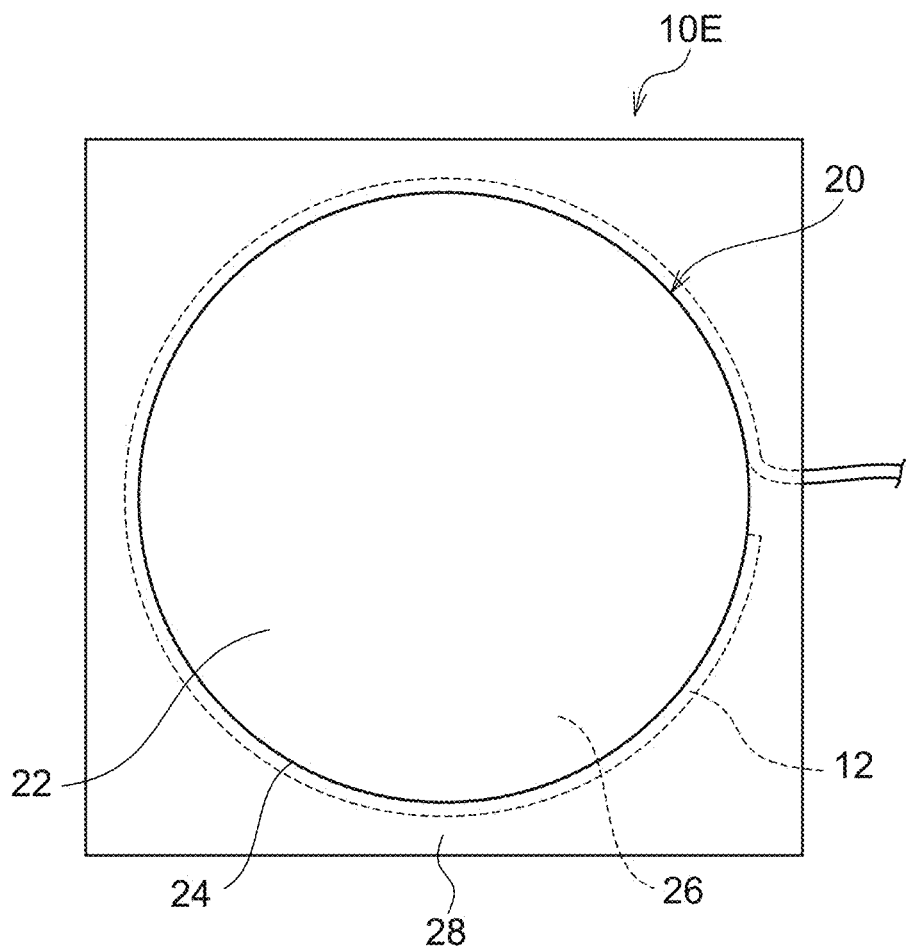
FIG. 9A is a plan view of a sensor module of a sixth embodiment.
Figure 9B:
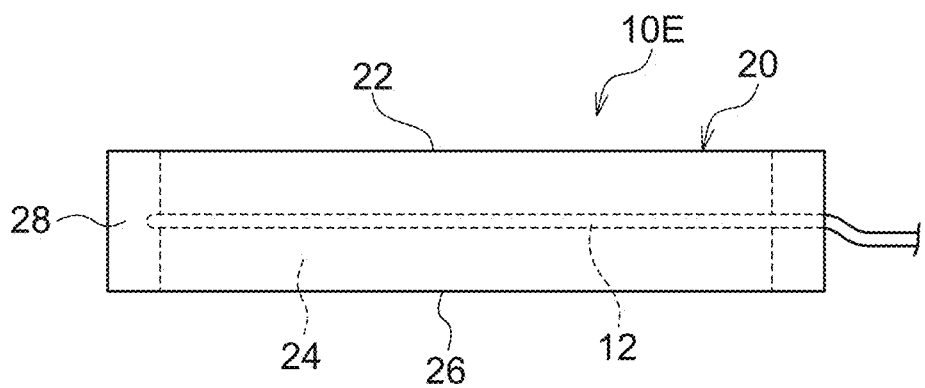
FIG. 9B is a side view of a sensor module of the sixth embodiment.

Explanation follows regarding a sensor module 10E of a sixth embodiment, with reference to FIG. 9A and FIG. 9B.

The sixth embodiment has a similar configuration to that of the fifth embodiment, except in that the shape of the protection member 28 is different to the shape thereof in the sensor module 10D of the fifth embodiment. Note that since structure other than that of the protection member 28 is the same as in the first and fifth embodiment, duplicate explanation thereof will be omitted.

As illustrated in FIG. 9A, the external appearance of the protection member 28 of the present embodiment is cuboidal, with a circular hole formed so as to penetrate through from the upper face to the lower face thereof. The inner diameter of the hole is equivalent to the outer diameter of the holding member 20. Moreover, as illustrated in FIG. 9B, the height of the protection member 28 is equivalent to the height of the holding member 20. Note that the height of the protection member 28 is not limited thereto, and there is no need to provide the protection member 28 so as to span from the installation face 26 to the pressure bearing face 22 as long as the piezoelectric substrate 12 is covered.

The sensor module 10E configured as described above exhibits similar operation and advantageous effects to those of the sensor module 10D of the fifth embodiment.

Note that the protection member 28 of the present embodiment is preferably formed from a softer material than the holding member 20 from the viewpoint of not suppressing deformation of the adjoining face 24 excessively. Alternatively the protection member 28 may be formed from the same material as the holding member 20. In such cases the protection member 28 and the holding member 20 may be formed as an integrated body.

Moreover, the protection members 28 illustrated in the fifth and sixth embodiments are merely examples thereof, and the shape of the protection member 28 may be freely designed as long deformation in the adjoining face 24 is not impeded and the piezoelectric substrate 12 can be covered. A protection member 28 having an external appearance as illustrated in the fifth or sixth embodiments may also be provided to the sensor module 10A including the cuboidal holding member 20A as in the second embodiment.

Seventh Embodiment

Figure 10A:
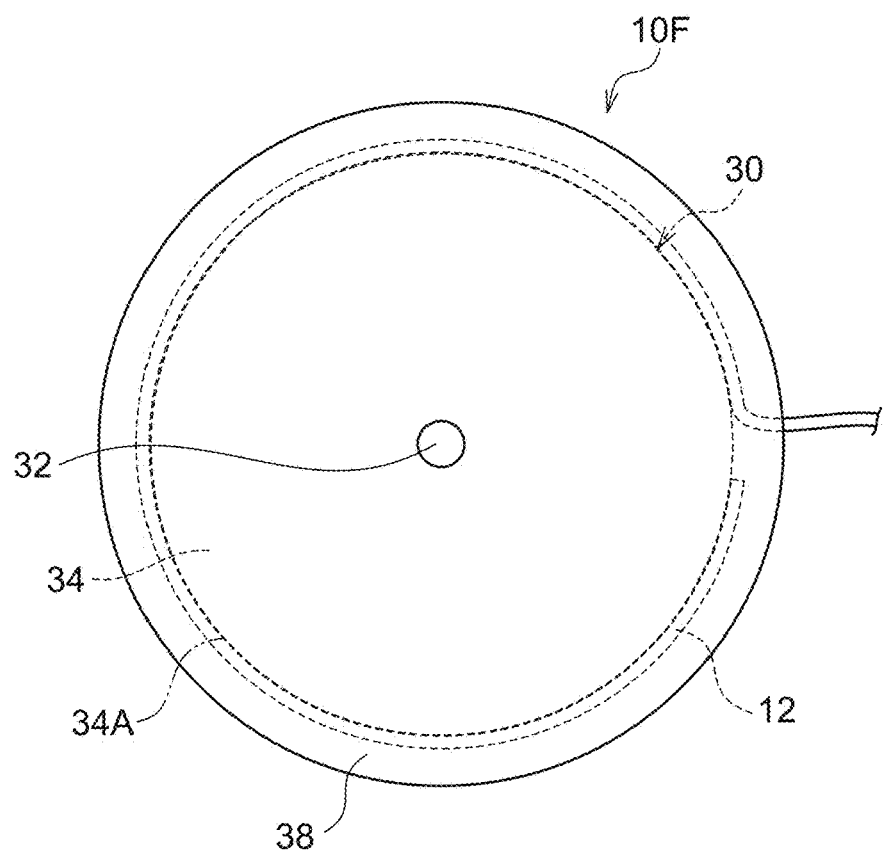
FIG. 10A is a plan view of a sensor module of a seventh embodiment.
Figure 10B:
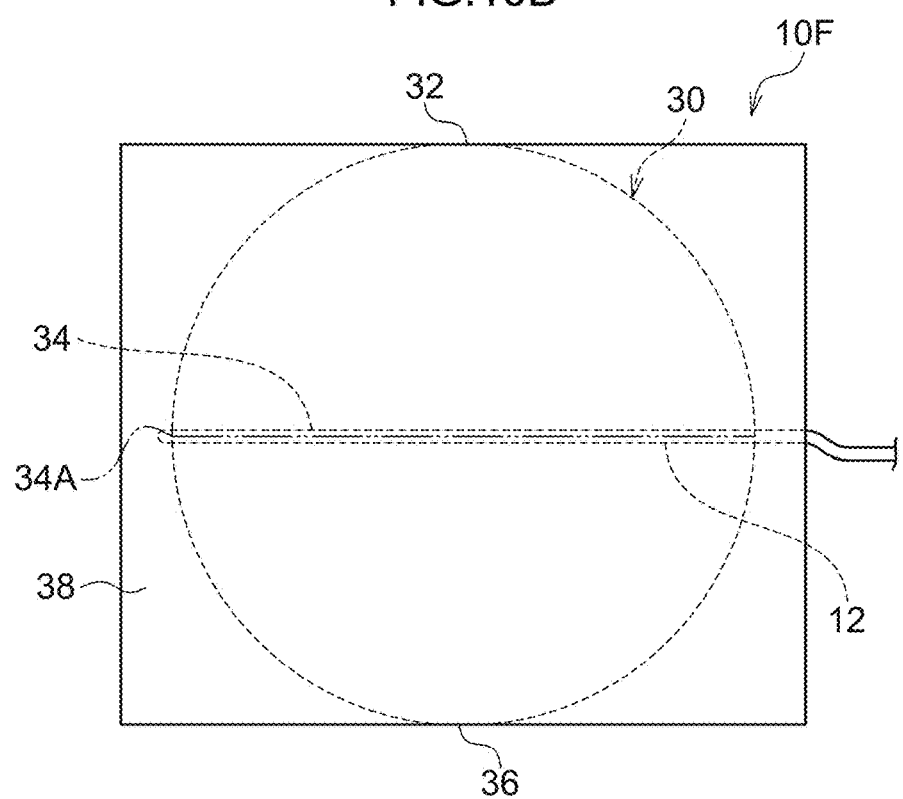
FIG. 10B is a side view of a sensor module of the seventh embodiment.

Explanation follows regarding a sensor module 10F of a seventh embodiment, with reference to FIG. 10A and FIG. 10B.

The seventh exemplary embodiment is an embodiment based on the sensor module 10B of the third embodiment, in which a protection member 38 formed of an elastic body is provided to an outer peripheral portion of a holding member 30. More specifically, the piezoelectric substrate 12 arranged on the outer peripheral portion 34A is covered by the protection member 38 except for at spherical face portions in the vicinity of the pressure bearing portion 32 and the installation portion 36 of the holding member 30. The structure other than the protection member 38 is the same as that of the third embodiment and so duplicate explanation thereof will be omitted.

As illustrated in FIG. 10A, the protection member 38 of the present embodiment has a cylindrical shaped external appearance, and is formed with a spherical internal space. The inner diameter of this space is equivalent to the outer diameter of the holding member 30. Moreover, as illustrated in FIG. 10B, the height of the protection member 38 is slightly less than the height of the holding member 20 and the pressure bearing portion 32 is exposed therefrom. The height of the protection member 38 is not limited thereto, and there is no need to provide the protection member 38 so as to span from the installation portion 36 to the pressure bearing portion 32 as long as the piezoelectric substrate 12 is covered.

The sensor module 10F configured in this manner has similar operation to that of the sensor module 10B of the third embodiment. Namely, the peripheral length of the outer peripheral portion 34A is extended as a result of compression occurring between the pressure bearing portion 32 and the installation portion 36 when pressure is borne by the pressure bearing portion 32. Tensile force is generated in the piezoelectric substrate 12 provided on the outer peripheral portion 34A by the peripheral length of the outer peripheral portion 34A extending, generating a voltage. Moreover, compressional force is generated in the piezoelectric substrate 12 as a result of the peripheral length of the outer peripheral portion 34A shrinking when the pressure bearing portion 32 is pulled away from the installation portion 36, and a voltage is generated thereby in the opposite direction to when tensile force is imparted to the piezoelectric substrate 12. Similar advantageous effects are exhibited thereby to those of the third embodiment.

Moreover, the present embodiment exhibits the following operation and advantageous effects in addition to the operation and advantageous effects of the third embodiment. Namely, in the present embodiment, obstacles can be prevented from contacting the piezoelectric substrate 12 when the sensor module 10B is employed in an exposed state due to the piezoelectric substrate 12 being protected by the protection member 38. Moreover, providing the protection member 38 so as to function as a "hoop" on the cylindrical face of the holding member 30 suppresses deformation of the intersecting plane 34 and the outer peripheral portion 34A when excessive pressure is applied to the pressure bearing portion 32, and thereby enables line breakage in the piezoelectric substrate 12 to be suppressed.

Note that the protection member 38 of the present embodiment is preferably formed from a softer material than the holding member 30 from the view point of not suppressing deformation of the intersecting plane 34 and the outer peripheral portion 34A excessively. Alternatively the protection member 38 may be formed from the same material as the holding member 30. In such cases the protection member 38 and the holding member 20 may be formed as an integrated body.

Eighth Embodiment

Figure 11A:
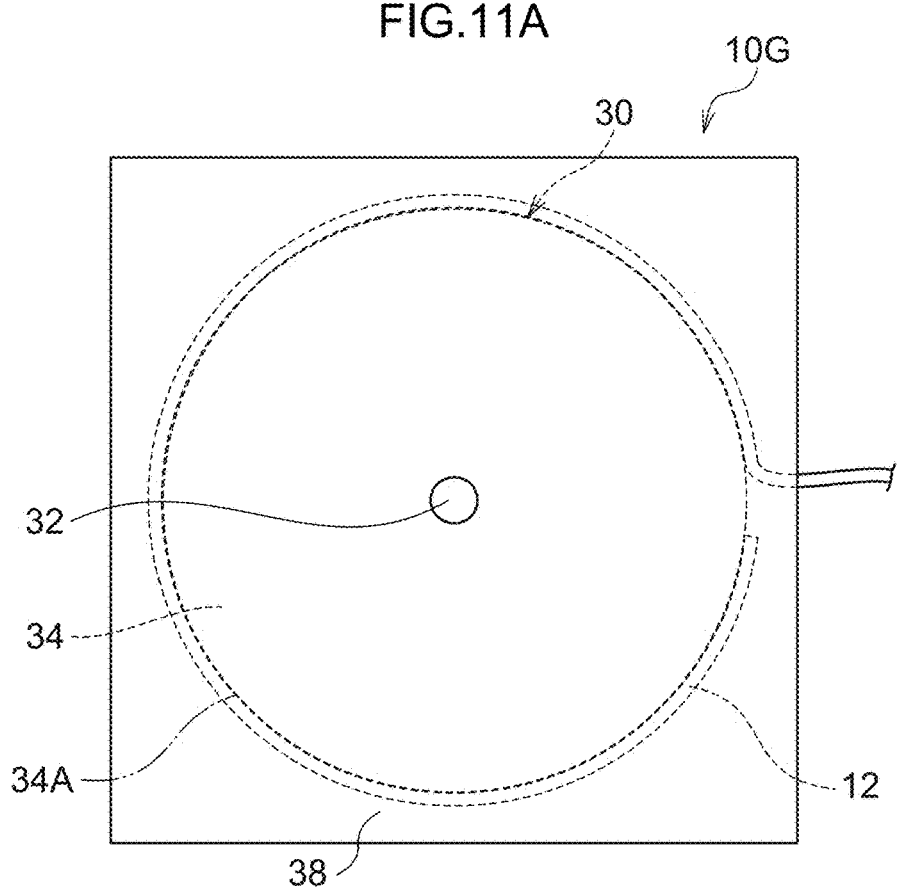
FIG. 11A is a plan view of a sensor module of an eighth embodiment.
Figure 11B:
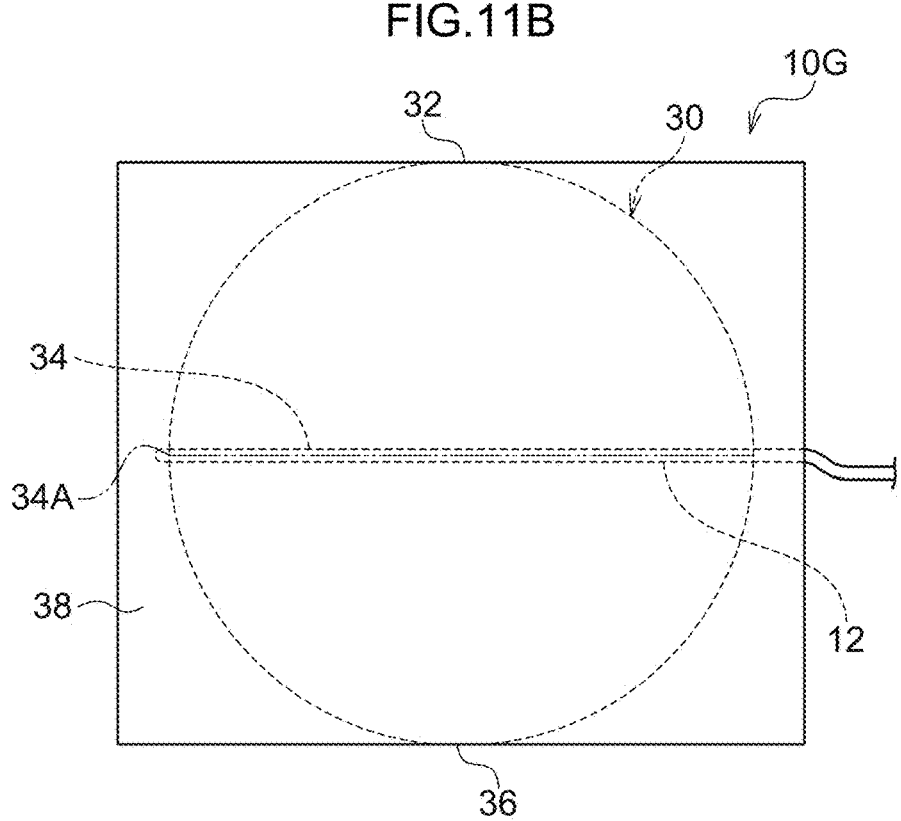
FIG. 11B is a side view of the sensor module of the eighth embodiment.

Explanation follows regarding a sensor module 10G of an eighth embodiment, with reference to FIG. 11A and FIG. 11B.

The eighth embodiment includes configuration similar to that of the seventh embodiment except for a protection member 38 having a different shape to that of the sensor module 10F of the seventh embodiment. Structure other than the protection member 38 is the same as that of the third and the seventh embodiments and so duplicate explanation thereof will be omitted.

As illustrated in FIG. 11A, the protection member 38 of the present embodiment has a cuboidal external appearance, and is formed with a spherical internal space. The inner diameter of this space is equivalent to the outer diameter of the holding member 30. Moreover, as illustrated in FIG. 11B, the height of the protection member 38 is slightly less than the height of the holding member 20. However, the height of the protection member 38 is not limited thereto, and there is no need to provide the protection member 38 so as to span from the installation portion 36 to the pressure bearing portion 32 as long as the piezoelectric substrate 12 is covered.

The sensor module 10G configured as described above exhibits similar operation and advantageous effects to those of the sensor module 10F of the seventh embodiment.

Note that the protection member 38 of the present embodiment is preferably formed from a softer material than the holding member 30 from the view point of not suppressing deformation of the intersecting plane 34 and the outer peripheral portion 34A excessively. Alternatively the protection member 38 may be formed from the same material as the holding member 30. In such cases the protection member 38 and the holding member 20 may be formed as an integrated body.

Moreover, the protection members 38 illustrated in the seventh and the eighth embodiments are merely examples thereof, and the shape of the protection member 38 may be freely designed as long as deformation of the intersecting plane 34 and the outer peripheral portion 34A is not impeded, and the piezoelectric substrate 12 can be covered.

Modified Example of Embodiments

Note that although in each of the embodiments the piezoelectric substrate 12 is wound one turn around the outer peripheral portion of the holding member 20, 20A, 30 (namely, of the adjoining face 24 or the outer peripheral portion 34A), the arrangement of the piezoelectric substrate 12 is not limited thereto. More specifically, the piezoelectric substrate 12 may be arranged as described in the following modified examples.

In a Modified Example 1, the piezoelectric substrate 12 may be wound plural turns around the holding member 20, 20A, 30. In such cases the piezoelectric substrate 12 may be wound in a spiral shape from the top to the bottom of the holding member 20, 20A, 30. For example, the piezoelectric substrate 12 may be wound in a spiral shape onto the holding member 20 of the first embodiment, from the pressure bearing face 22 to the installation face 26. Modified Example 1 enables evening out of variations to the pressure borne in the deformation of the adjoining face 24, enabling misdetections arising from differences in the location where the pressure is borne and the direction the pressure is borne to be reduced.

In Modified Example 2, the piezoelectric substrate 12 may be installed to a portion of the holding member 20, 20A, 30. For example, in the holding member 20A of the second embodiment, the piezoelectric substrate 12 may be installed only on the first adjoining face 24A. In such cases there is no need to install the piezoelectric substrate 12 parallel to the pressure bearing face 22, and the piezoelectric substrate 12 may be installed along an intersecting direction including a component perpendicular to the pressure bearing face 22.

The Modified Example 2 enables the length of the piezoelectric substrate 12 installed to be shortened.

In Modified Example 3 there may be plural piezoelectric substrates 12 installed to the holding member 20, 20A, 30. For example, plural piezoelectric substrates 12 may be joined together before being installed on the holding member 20 of the first embodiment so as to go around the adjoining face 24. Moreover, for example, a piezoelectric substrate 12 may be installed on each of the adjoining faces 24 in the holding member 20A of the second embodiment. Installing plural of the piezoelectric substrates 12 to the holding member 20, 20A, 30 enables the Modified Example 3 to suppress line breakage of the piezoelectric substrate 12 from occurring even in cases in which the material of the holding member 20, 20A, 30 is soft and deformation is excessively large.

Note that the embodiments and the modified examples may be freely combined, and various embodiments implement within a range not departing from the spirit of the present invention.

Pressure Distribution Sensor

The sensor module of each of the embodiments may be applied to a pressure distribution sensor 50. Explanation follows regarding an example in which the sensor module 10 of the first embodiment is applied to the pressure distribution sensor 50.

Figure 12A:
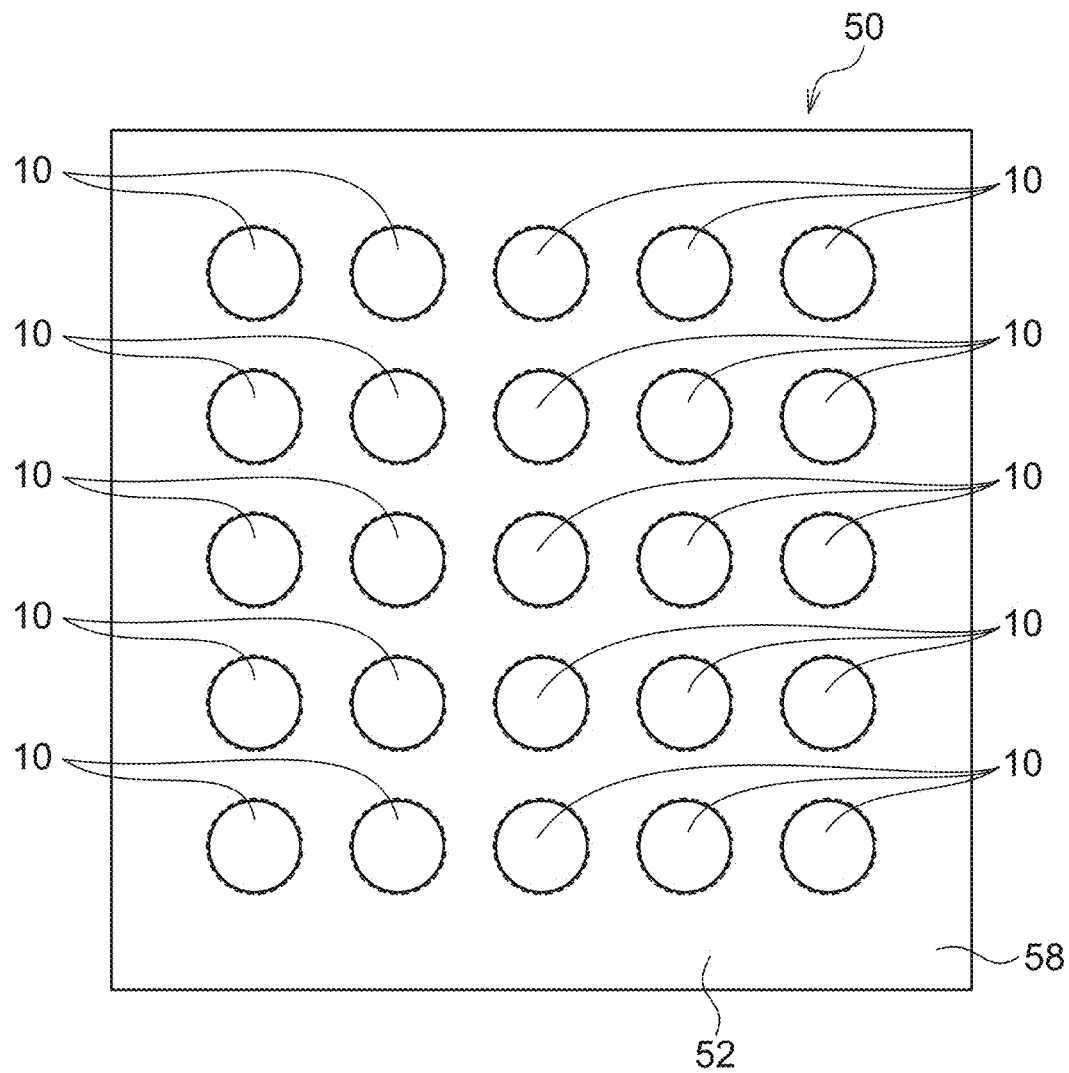
FIG. 12A is a plan view of a pressure distribution sensor.
Figure 12B:
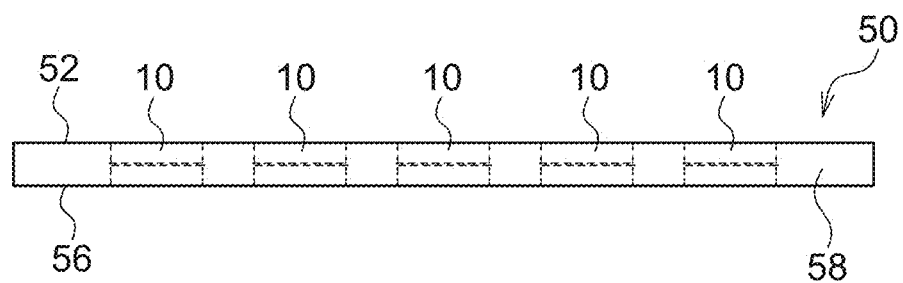
FIG. 12B is a side view of the pressure distribution sensor.

As illustrated in FIG. 12A and FIG. 12B, the pressure distribution sensor 50 of an embodiment has plural of the sensor modules 10 arranged in a lattice pattern. More specifically, as illustrated in FIG. 12A, a total of 25 sensor modules 10 are arranged in the pressure distribution sensor 50 in a 5 row by 5 column pattern on a base member 58 made from a material the same as or softer than the holding members 20. In FIG. 12A and FIG. 12B, the piezoelectric substrates 12 provided on the periphery of the holding members 20, and the piezoelectric substrates 12 extending from the holding member 20 are omitted from illustration. Note that the number of the sensor modules 10 and the arrangement pattern thereof is not limited thereto.

As illustrated in FIG. 12B, an upper face 52 of the base member 58 is formed in the same plane as the pressure bearing faces 22 of the sensor modules 10, and a lower face 56 of the base member 58 is formed in the same plane as the installation faces 26 of the sensor modules 10. Note that the positions of the upper face 52 and the lower face 56 of the base member 58 are not limited thereto, and the base member 58 does not need to always be provided so as to span from the installation face 26 to the pressure bearing face 22 as long as each of the sensor modules can be fixed.

The pressure distribution sensor 50 of the present embodiment enables the distribution of pressure applied to the upper face 52 to be found from the voltages output in accordance with the pressure by each of the sensor modules 10 when pressure is applied to the upper face 52.

The pressure distribution sensor 50 of the present embodiment may, for example, be installed to a seat face of a chair to measure the seat face distribution when a person has sat on the chair. Moreover, for example, installing the pressure distribution sensor 50 to a bed mat enables the body pressure distribution to be measured when a person is lying thereon.

Supplementary Explanation

The sensor modules of each of the embodiments may be applied to a pressure distribution sensor as described above, and may also be employed in a pressure detection sensor such as a touch sensor, a pressure detection contact sensor, and in a biometric sensor to detect lingual pressure measurements, heart beats, breathing, and the like. Alternatively, the sensor modules of each of the embodiments may be adopted for the following sensors. Examples of such sensors include shock sensors, vibration sensors, and the like.

Moreover, the sensors described above may be employed by being mounted, or these sensors may be employed by integration into a structural body. For example, the sensors may be employed in structural bodies that move, such as in vehicles (four-wheel vehicles, two-wheel vehicles, etc.), trains, wagon, ships, aircraft, bicycles, trollies, caster trucks, robots, actuators, and the like. More examples thereof include being employed in structural bodies to protect people, such as in protectors, supporters, shoes, clothes, caps, helmets, and the like. Further examples thereof include being employed in fixtures and fittings such as wall materials, window frames, flooring materials, carpets, cushions, beds, chairs, vehicle seats, and the like. Examples of flooring materials include timber and plastics, tatami, artificial tatami formed of resin, metal, glass, and the like.

Further specific explanation follows regarding examples of the present invention, however as long as the spirit of the present invention is not exceeded, the present invention is not limited by the following examples.

Plural sensor modules 10, 100, 110 installed with cable shaped piezoelectric substrates 12 were manufactured as examples and comparative examples.

Example 1

As illustrated in FIG. 1, the sensor module 10 of Example 1 includes a cylindrical shaped holding member 20 and a piezoelectric substrate 12 wound around an adjoining face 24 configuring a side face of the holding member 20. In the Example 1, the piezoelectric substrate 12 is fixed with adhesive at all the portions thereof that contact the adjoining face 24. Namely, there is a non-illustrated adhesive layer present at all the portions of contact between the piezoelectric substrate 12 and the adjoining face 24.

Piezoelectric Substrate Manufacturing Method

A micro-slit ribbon having a thickness of 50 μm and a width of 0.6 mm was produced from a piezoelectric film (PLA film). Next, the micro-slit ribbon was wrapped onto a tinsel wire (catalog number: u24) manufactured by Meisei Industry Co., Ltd in an S-winding (counterclockwise) direction at an oblique direction at 45° to the lengthwise direction of the tinsel wire. As the outer conductor further to the outside thereof, a rolled copper foil with a width of 0.3 mm and a thickness of 30 μm was wrapped densely in a Z winding direction around such that the micro-slit ribbon is not exposed to the outside so as to produce the piezoelectric substrate 12.

Figure 14:
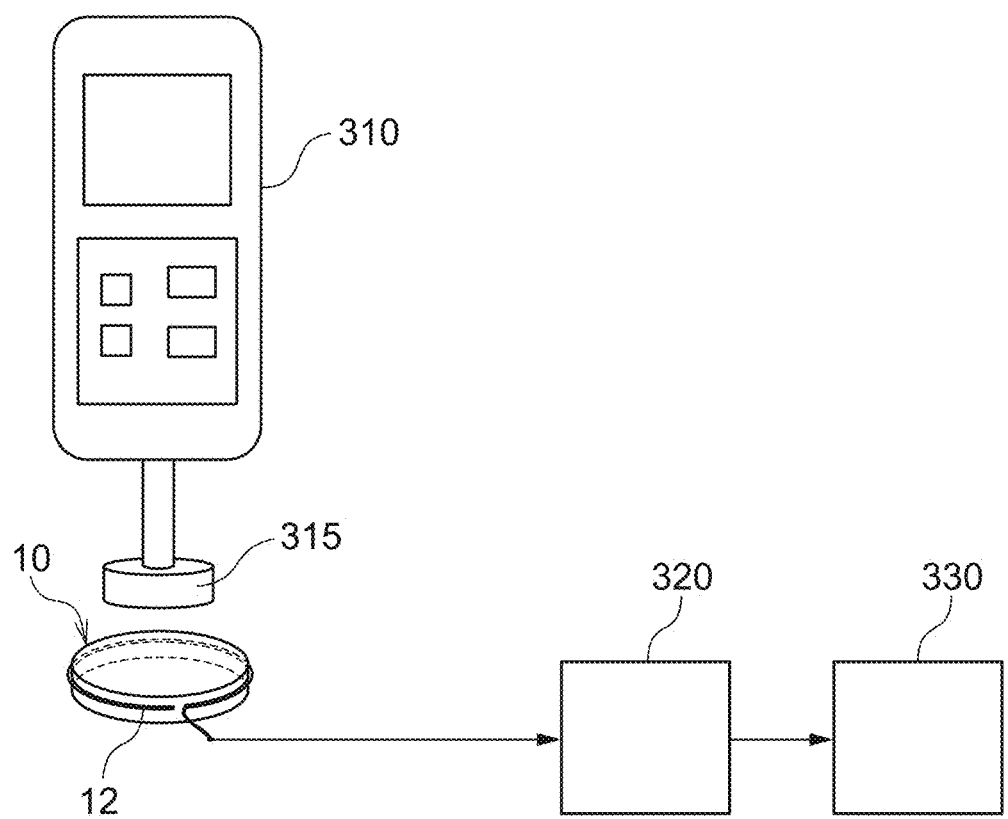
FIG. 14 is a schematic diagram of a device related to measuring voltage sensitivity.

Moreover, in order to perform actual pressure detection, the piezoelectric substrate 12 was cut into 70 mm lengths, with 60 mm thereof serving as a region where strain is actually measured, and the remaining 10 mm portion serving as a connection electrode portion connected to an A/D converter (USB-6210, made by National Instruments) to perform evaluation (see FIG. 14).

Sensor Module Manufacture

The sensor module 10 in each of the examples was cylindrical in shape, having a diameter of 20 mm and a height of 5 mm, as illustrated in FIG. 1. In the sensor module 10 of Example 1, the holding member 20 for installing the piezoelectric substrate 12 on was obtained by molding a urethane into a cylindrical shape. The urethane was produced by mixing a liquid A made from a polyol and a dibasic acid ester with a liquid B made from 4-4'-MDI and a dibasic acid ester together at a ratio of 10:1. The piezoelectric substrate 12 was arranged on the thus formed holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd).

Example 2

In the sensor module 10 of Example 2, the holding member 20 was obtained by molding a urethane into a cylindrical shape. The urethane was produced by mixing a liquid A made from a polyol and a dibasic acid ester with a liquid B made from 4-4'-MDI and a dibasic acid ester together at a ratio of 4:1. The piezoelectric substrate 12 was arranged on the thus formed holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd).

Example 3

In the sensor module 10 of Example 3, the holding member 20 was obtained by molding a silicone elastomer into a cylindrical shape. The piezoelectric substrate 12 was arranged on the thus formed holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd).

Example 4

In the sensor module 10 of Example 4, the holding member 20 was obtained by molding an isoprene rubber into a cylindrical shape. The piezoelectric substrate 12 was arranged on the thus formed holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd).

Example 5

In the sensor module 10 of Example 5, the holding member 20 was obtained by molding an acrylic resin into a cylindrical shape. The piezoelectric substrate 12 was arranged on the thus formed holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd).

Comparative Example 1

A sensor module 100 of Comparative Example 1 employed a holding member 20 the same as that of Example 2. As illustrated in FIG. 16A, the piezoelectric substrate 12 was arranged on a pressure bearing face 22, which is the front face (upper face) of the holding member 20, and fixed thereto by adhesive (Super X No. 8008, manufactured by Cemedine Co., Ltd).

Comparative Example 2

A sensor module 110 of Comparative Example 2 employed a holding member 20 the same as that of Example 2 and Comparative Example 1. As illustrated in FIG. 16B, the piezoelectric substrate 12 was arranged on the installation face 26, which is the back face (lower face) of the holding member 20, and fixed thereto by adhesive (Super X No. 8008, manufactured by Cemedine Co., Ltd).

Indentation Measurement

Figure 13:
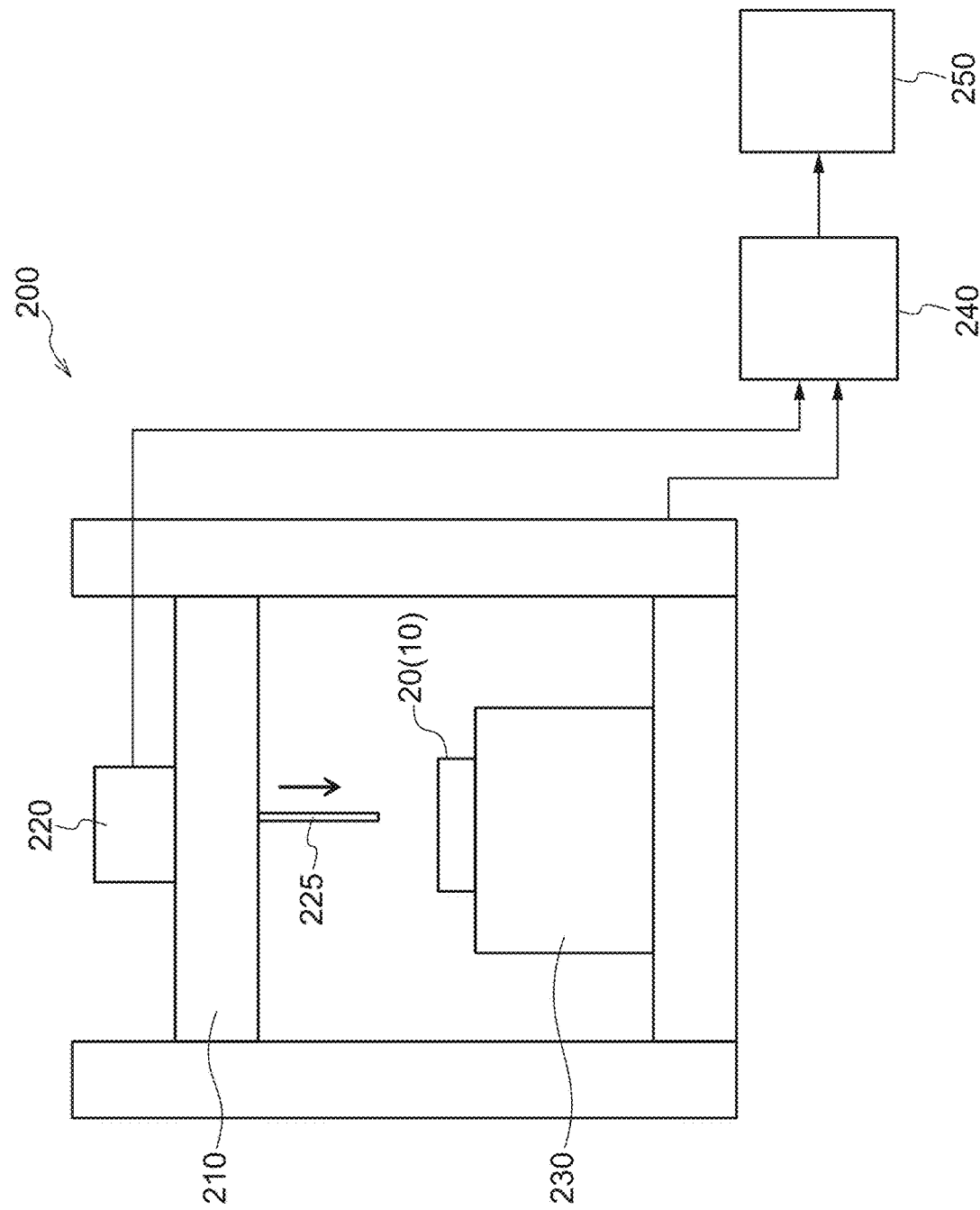
FIG. 13 is a front elevation of a tensile tester employed to measure indentation.

The indentation (mm) per unit load was measured order to ascertain the physical properties of the holding member 20 for each of the examples and comparative examples manufactured as described above. More specifically, a tensile tester (TENSILON RTG-1250, manufactured by A&D Company Ltd.) was employed to measure the indentation (mm) when a metal cylindrical rod of 10 mm diameter was pressed into the pressure bearing face 22 of the holding member 20 with a load of 1 N. As illustrated in FIG. 13, the tensile tester 200 included a vertically movable crosshead 210, a load cell 220 fixed to the crosshead 210, a push-rod 225 installed on the leading end of the load cell 220, and a mounting table 230 for placing objects to be measured thereon. The push-rod 225 was formed in a cylindrical shape having a leading end portion of 10 mm diameter. The sensor module 10 was fixed to the mounting table 230 so that the push-rod 225 made contact with the center of the pressure bearing face 22.

An AD converter 240 was respectively input with load detected by the load cell 220 and with a strain value of the movement amount of the vertically movable crosshead 210. Information digitalized by the AD converter 240 was output to an analysis PC 250, and detection values computed in the analysis PC 250.

The indentation per unit load of the holding member 20 was found using the tensile tester 200 for the sensor modules 10, 100, 110 of each of the examples and comparative examples.

Voltage Sensitivity Measurement

The voltage generated per unit load was found in order to ascertain the voltage sensitivity of the sensor modules 10, 100, 110 of each of the examples and comparative examples manufactured as described above. As illustrated in FIG. 14, the voltage sensitivity was measured using a force gauge 310 (FGP-10 manufactured by SHIMPO Corporation), an AD converter 320 (USB-6210 manufactured by National Instruments Corporation), and an analysis PC 330. A push-rod 315 including a circular disk shaped indenter having a diameter of 12 mm was provided to the force gauge 310. The piezoelectric substrate 12 in the sensor module 10 to be measured was connected to the AD converter 320.

Then, with the sensor module 10 set on a flat surface such as on a surface plate, the push-rod 315 was pressed so as to make perpendicular contact with a central portion of the pressure bearing face 22 of the sensor module 10. Tension accompanying deformation of the holding member 20 is thereby applied to the piezoelectric substrate 12 arranged on the adjoining face 24, generating charge by a piezoelectric effect. A voltage arising from the generated charge and sampled through the AD converter 320 is measured by the analysis PC 330.

The voltage sensitivity was then computed in the following manner. First maximum values were read in for the generated voltage (Vp–p) when loads of 5 N, 10 N, 15 N, and 20 N are applied to the pressure bearing face 22, and the generated voltage (Vp–p) as measured by the analysis PC 330 was plotted on the vertical axis and the load (N) plotted on the horizontal axis. The slope of a straight line, produced by straight line approximation using a least squares method and representing the generated voltage (Vp–p) per unit load (N), was then taken as the voltage sensitivity.

The measurement results of the indentation and the computed results for the voltage sensitivity for each of the examples and comparative examples are illustrated below.

Figure 15:
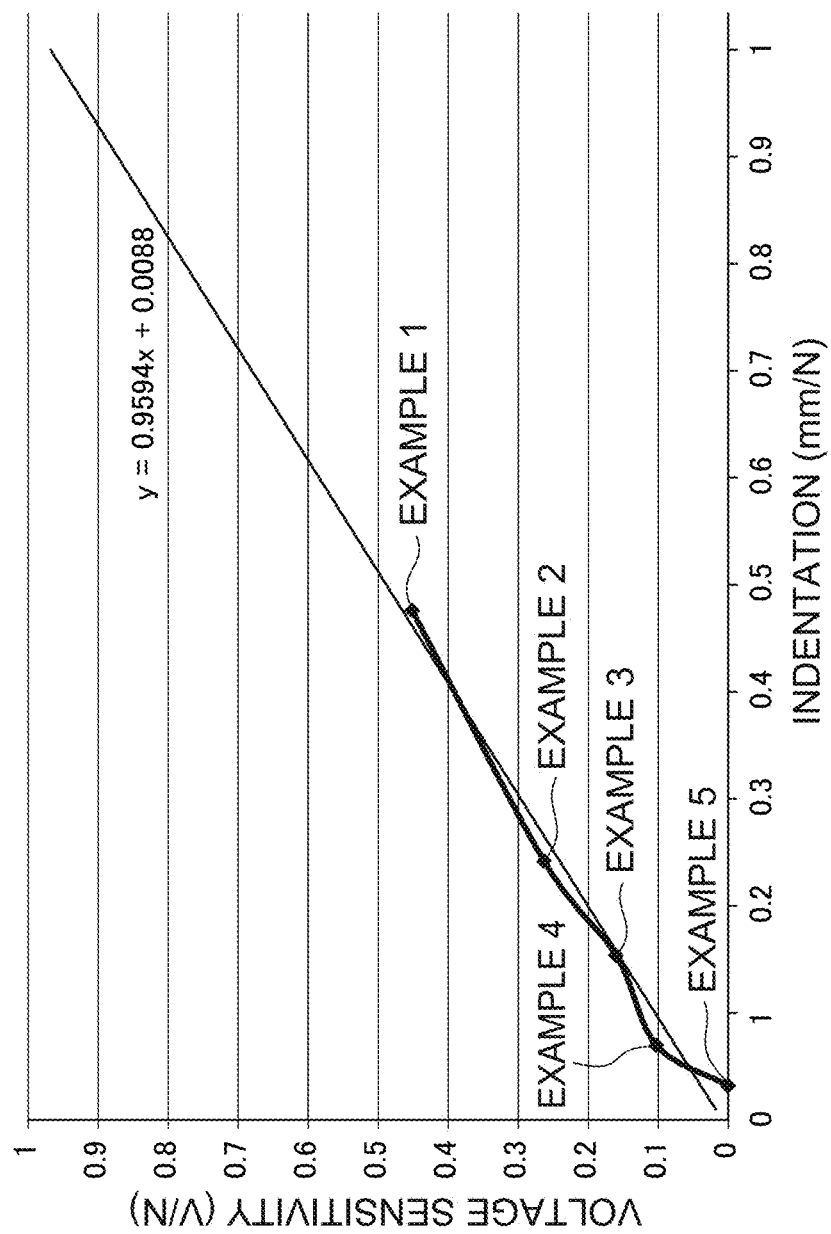
FIG. 15 is a graph illustrating a relationship between indentation and voltage sensitivity.

Table 1 includes the measurement results of the indentation and the computed results for the voltage sensitivity for Examples 1 to 5. FIG. 15 illustrates a graph with the indentations of Table 1 plotted on the horizontal axis, and voltage sensitivities thereof plotted on the vertical axis. As illustrated in Table 1, it is apparent that the voltage sensitivity increases as the indentation of each example increases. Moreover, as illustrated in FIG. 15, it is apparent from looking at the relationship between the indentation and the voltage sensitivity that they have a proportional relationship to each other. In particular, a proportional relationship is established between the indentation and the voltage sensitivity over a range in which the indentation per unit load is from 0.01 mm to 1.0 mm.

Thus is can be said that for the examples, the voltage sensitivity has a proportional relationship to the softness of the holding member 20 as expressed by the indentation. Thus pressure applied to the pressure bearing face 22 can be detected with a high sensitivity by employing a holding member 20 having an indentation in a range of from 0.01 mm to 1.0 mm, and more preferably in a range of from 0.03 mm to 0.5 mm.

Note that when the holding member 20 is formed of agar, for reference, the indentation per unit load is, at 2.097 mm/N, comparatively large compared to each of the examples, and the voltage sensitivity is, at 0.0258 V/N, second lowest to Example 5. This is because the agar holding member 20 is too soft compared to the material of the holding member 20 of each of the examples, and pressure borne by the pressure bearing face 22 does not spread out to the adjoining face 24. Namely, deformation only occurs at the pressure bearing face 22 and hardly any deformation occurs at the adjoining face 24. Tensile force is accordingly not applied to the piezoelectric substrate 12, and voltage is not generated.

TABLE 1

| | Substance | Indentation (mm/N) | Voltage Sensitivity (V/N) |
|---|---|---|---|
| Example 1 | Urethane A | 0.476 | 0.4516 |
| Example 2 | Urethane B | 0.242 | 0.2632 |
| Example 3 | Silicone | 0.154 | 0.1604 |
| Example 4 | Rubber | 0.070 | 0.1028 |
| Example 5 | Acrylic | 0.032 | 0.0004 |

Note that although the voltage sensitivity of Example 5 including the holding member 20 made from acrylic is lower than that of the other examples, the voltage sensitivity is still sufficiently within a usable practical range for a sensor module for measuring high pressures (for example, loads larger than the load of 20 N employed to measure voltage sensitivity). Considering the above, a sensor module can be provided that is appropriate to the measurement load by employing the sensor module 10 including a soft holding member 20 when the measurement load is small, and by employing the sensor module 10 including a hard holding member 20 when the measurement load is large.

Table 2 lists the computed results of voltage sensitivity for Example 2 and for Comparative Examples 1 and 2. As illustrated in Table 2, it is apparent from a comparison of Example 2 and Comparative Examples 1 and 2, which all include a holding member 20 made from the same material, that the voltage sensitivity is greater when the piezoelectric substrate 12 is installed on the adjoining face 24, which is the side face of the holding member 20. The voltage sensitivity of Comparative Example 1 in which the piezoelectric substrate 12 is installed to the pressure bearing face 22, which is the front face of the holding member 20, and the voltage sensitivity of Comparative Example 2 in which the piezoelectric substrate 12 is installed to the installation face 26, which is the back face of the holding member 20, are lower than the voltage sensitivity for Example 2. Moreover, a difference arises between the voltage sensitivity of Comparative Example 1 and Comparative Example 2. Namely, the front and rear of the elastic body holding member 20 need to be used in a discriminate manner when in use due to there being a different voltage sensitivity in Comparative Examples 1 and 2 depending on whether the piezoelectric substrate 12 is provided on the front face or the back face of the holding member 20. Load acts directly on the piezoelectric substrate 12 in the case of Comparative Example 1, and so there is a large mechanical load thereon. Thus the piezoelectric substrate 12 in the sensor module 100 of Comparative Example 1 is liable to be damaged, such as by line breakage, when a pointed object of the like makes contact.

Considering the above, not only is there no need to discriminate in use between front and back with Example 2, in contrast to with Comparative Examples 1 and 2, but Example 2 can also be said to be a sensor module having higher sensitivity due being compatible with high loads.

TABLE 2

| | Piezoelectric Substrate Arrangement | Indentation (mm/N) | Voltage Sensitivity (V/N) |
|---|---|---|---|
| Example 2 | adjoining face | 0.242 | 0.2632 |
| Comparative Example 1 | pressure bearing face | | 0.0391 |
| Comparative Example 2 | installation face | | 0.0361 |

Example 6 was employed to verify what occurs when the pressure bearing face 22 is pulled away from the installation face 26.

Example 6

The sensor module 10 of Example 6 has a cylindrical shape, as illustrated in FIG. 1, with a diameter of 50 mm and a height of 20 mm. The piezoelectric substrate 12 of Example 6 is the same as the piezoelectric substrate in each of the embodiments described above. The holding member 20 of Example 6 is made from a natural rubber sponge. The piezoelectric substrate 12 was arranged on the holding member 20 so as to be parallel to the pressure bearing face 22, and so as to wrap one turn around the up-down direction center of the adjoining face 24 (see FIG. 1). When doing so, the piezoelectric substrate 12 was fixed to the adjoining face 24 with an adhesive (Super X No. 8008, manufactured by Cemedine Co., Ltd). Hooks (specifically BX1-16 hanging hooks, manufactured by Mitsuya Corporation) were respectively provided to the pressure bearing face 22 and to the installation face 26.

The sensor module 10 produced for Example 6 was employed to measure charge and deformation in pull-tests. The deformation was found by measuring displacement with a tensile tester (TENSILON RTG-1250, manufactured by A&D Company Ltd.) when a tensile load of 5 N was applied across the pressure bearing face 22 and the installation face 26. The charge was measured by connecting an electrometer (Model 617 manufactured by Keithley Instruments, Inc.) to the piezoelectric substrate 12.

The measurement results were that the deformation per unit load was 0.205 mm/N, and the charge per unit load was −30.26 pC/N. Note that for Example 6, the charge was positive when the pressure bearing face 22 was compressed and a tensile force applied to the piezoelectric substrate 12, and the charge was negative when the pressure bearing face 22 was pulled and a compressional force was applied to the piezoelectric substrate 12.

It was accordingly confirmed as described above that a compressional force was generated in the piezoelectric substrate 12 installed to the adjoining face 24 by compressional deformation of the adjoining face 24 when the pressure bearing face 22 was pulled away from the installation face 26, generating a charge (namely, a voltage) in the opposite direction to that when a tensile force is applied to the piezoelectric substrate 12.

The entire content of the disclosure of Japanese Patent Application No. 2017-153933 filed on Aug. 9, 2017 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

EXPLANATION OF THE REFERENCE NUMERALS 10 sensor module
12 piezoelectric substrate
14 rubber string (piece of elastic)
16A inner conductor (conductor)
18A first piezoelectric material
18B second piezoelectric material
20 holding member
22 pressure bearing face
24 adjoining face
24A first adjoining face
24B second adjoining face
24C third adjoining face
24D fourth adjoining face
28 protection member
30 holding member
32 pressure bearing portion
34 intersecting plane
34A outer peripheral portion (outer edge portion of intersecting plane)
38 protection member
50 pressure distribution sensor

The invention claimed is:

1. A sensor module, comprising:
a cylindrical holding member formed of an elastic body;
a pressure bearing face provided at the holding member and configured to bear pressure, the pressure bearing face being a bottom face of the holding member;
an adjoining face provided at the holding member so as to adjoin the pressure bearing face and configured to undergo deformation in accordance with the pressure borne by the pressure bearing face, the adjoining face being a cylindrical face of the holding member; and
a single elongate piezoelectric cable wound around the adjoining face,
wherein, at the adjoining face, the piezoelectric cable is provided so as to surround the holding member around a pressure bearing direction which is a direction that the pressure is borne, and a winding angle of the piezoelectric cable with respect to a longitudinal direction of the holding member is substantially 90°.

2. The sensor module of claim 1, wherein, when applied with a load, the holding member has a deformation per unit load in a range of from 0.01 mm to 1.0 mm.

3. The sensor module of claim 1, wherein:
the piezoelectric cable includes an elongate conductor, and an elongate piezoelectric material helically wound onto the conductor in one direction; and
the piezoelectric material is formed from an organic piezoelectric material.

4. The sensor module of claim 3, wherein the piezoelectric material is an optically active helical chiral polymer (A).

5. The sensor module of claim 4, wherein the helical chiral polymer (A) is polylactic acid.

6. The sensor module of claim 1, wherein a string-shaped elastic member is connected to a leading end of the piezoelectric cable, and the elastic member is disposed together with the piezoelectric cable at the holding member.

7. The sensor module of claim 1, further comprising a protection member formed of an elastic body and provided at an outer peripheral portion of the holding member.

8. A sensor module, comprising:
a spherical holding member formed of an elastic body;
a pressure bearing portion provided at the holding member and configured to bear pressure;
an intersecting plane provided at the holding member so as to intersect a pressure bearing direction which is a direction that the pressure is borne and configured to undergo deformation in accordance with the pressure borne by the pressure bearing portion; and
a single elongate piezoelectric cable wound along an outer edge portion of the intersecting plane, and a winding angle of the piezoelectric cable with respect to a longitudinal direction of the holding member is substantially 90°.

9. A pressure distribution sensor comprising a plurality of sensor modules,
wherein the plurality of the sensor modules are arranged in a lattice pattern, and
wherein the sensor modules each comprise:
a cylindrical holding member formed of an elastic body;
a pressure bearing face provided at the holding member and configured to bear pressure, the pressure bearing face being a bottom face of the holding member;
an adjoining face provided at the holding member so as to adjoin the pressure bearing face and configured to undergo deformation in accordance with the pressure borne by the pressure bearing face, the adjoining face being a cylindrical face of the holding member; and
a single elongate piezoelectric substrate cable arranged on wound around the adjoining face,
wherein, at the adjoining face, the piezoelectric substrate cable is provided so as to surround the holding member around a pressure bearing direction which is a direction that the pressure is borne, and a winding angle of the piezoelectric cable with respect to a longitudinal direction of the holding member is substantially 90°.

\* \* \* \* \*